United States Patent
Ito

(10) Patent No.: US 11,653,093 B2
(45) Date of Patent: May 16, 2023

(54) FOCUS DETECTION DEVICE AND FOCUS DETECTION METHOD

(71) Applicant: Olympus Corporation, Hachioji (JP)

(72) Inventor: Satoru Ito, Komae (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 17/513,842

(22) Filed: Oct. 28, 2021

(65) Prior Publication Data

US 2022/0182553 A1   Jun. 9, 2022

(30) Foreign Application Priority Data

Dec. 7, 2020   (JP) .............................. JP2020-202622

(51) Int. Cl.
*H04N 23/67*   (2023.01)

(52) U.S. Cl.
CPC ................................. *H04N 23/673* (2023.01)

(58) Field of Classification Search
CPC ........... H04N 5/23212; H04N 5/23261; H04N 5/23299; H04N 5/23215; H04N 23/673; H04N 23/67; H04N 23/6811; H04N 23/6812; H04N 23/6815
See application file for complete search history.

(56) References Cited

U.S. PATENT DOCUMENTS

| | | | |
|---|---|---|---|
| 2012/0219278 A1* | 8/2012 | Suzuki ..................... | G02B 7/28 396/95 |
| 2012/0242881 A1* | 9/2012 | Suzuki ............... | H04N 5/23222 348/E5.045 |
| 2013/0021518 A1* | 1/2013 | Hirai .................. | H04N 5/23296 348/E5.045 |
| 2016/0080636 A1 | 3/2016 | Konishi | |
| 2021/0058543 A1* | 2/2021 | Hongu ..................... | G03B 3/10 |

* cited by examiner

*Primary Examiner* — Timothy J Henn
(74) *Attorney, Agent, or Firm* — John C. Pokotylo; Pokotylo Patent Services

(57) ABSTRACT

A focus detection device, comprising an image sensor, and that performs focus detection by calculating evaluation values representing contrast based on an image signal, while executing a scan operation of the image sensor, comprising a positional change detection circuit for detecting positional change of the focus detection device, and a processor having a running time setting section and a control section, wherein the running time setting section sets running time to restrict focus movement range of the scan operation based on the positional change, and the control section performs focus detection by restricting focus movement rage of the scan operation based on the running time.

17 Claims, 11 Drawing Sheets

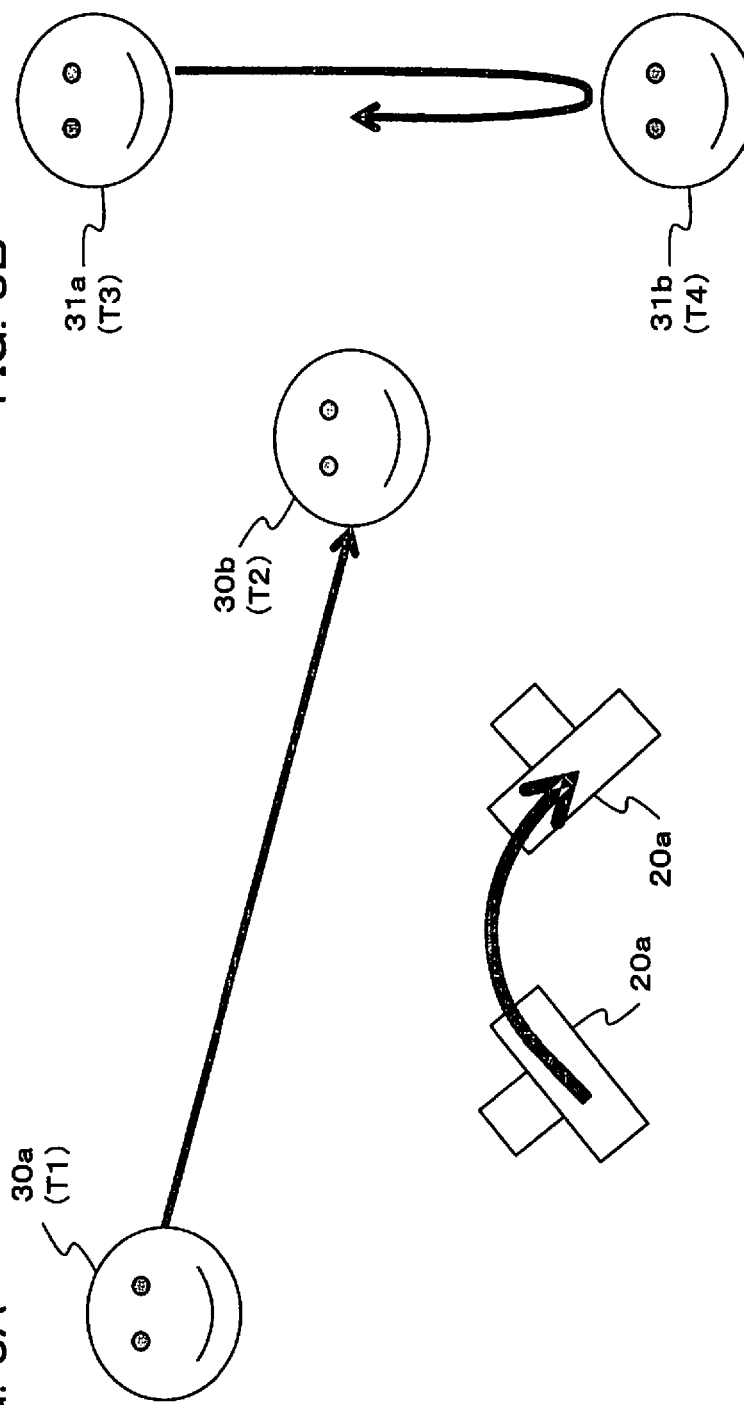
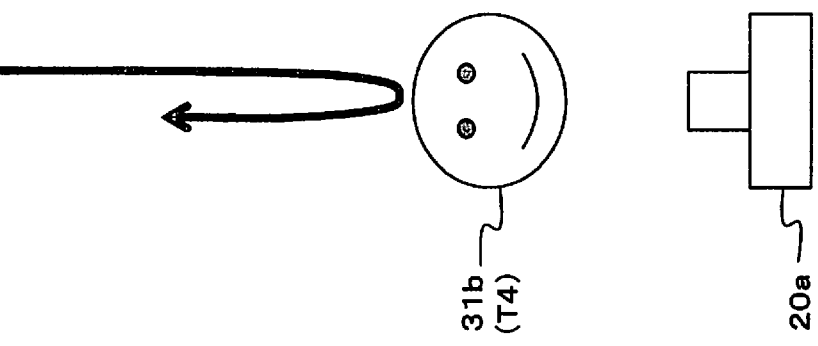

FOCUS DETECTION DEVICE AND FOCUS DETECTION METHOD

CROSS-REFERENCE TO RELATED APPLICATIONS

Benefit is claimed, under 35 U.S.C. § 119, to the filing date of prior Japanese Patent Application No. 2020-202622 filed on Dec. 7, 2020. This application is expressly incorporated herein by reference. The scope of the present invention is not limited to any requirements of the specific embodiments described in the application.

BACKGROUND OF THE INVENTION

1. Field of the Invention

The present invention relates to a focus detection device and focus detection method that maintain a focused state by tracking a subject using contrast AF.

2. Description of the Related Art

There have been various proposals for a focus detection device that, when performing rapid shooting, maintains focus on a moving subject using contrast AF, and prevents significant blurring even for a low contrast subject and in a low light environment. For example, a focus detection device that estimates in-focus position for a subject that is moving closer, and changes scan range of a focus lens, is disclosed in Japanese patent laid-open No. 2016-061797 (hereafter referred to as "patent publication 1").

It becomes possible to continue focusing to a certain extent by changing scan range of the focus lens in accordance with the in-focus position that has been estimated. However, in a case where the subject recedes rapidly at the close-up end, AF no longer tracks, and shooting is not possible, or is performed while not being in focus.

SUMMARY OF THE INVENTION

The present invention provides a focus detection device and focus detection method with which AF can track, even when a subject recedes rapidly.

A focus detection device of a first aspect of the present invention is a focus detection device comprising an image sensor that outputs an image signal by subjecting subject light that passes through a photographing optical system to photoelectric conversion, and that performs focus detection by calculating evaluation values representing contrast based on the image signal, while executing a scan operation to change focus of an image plane of the image sensor to change, comprising a positional change detection circuit detecting positional change of the focus detection device, and a processor having a running time setting section and a control section, wherein the running time setting section sets running time to restrict focus movement range of the scan operation based on the positional change, and the control section performs focus detection by restricting focus movement rage of the scan operation based on the running time.

A focus detection method of a second aspect of the present invention is a focus detection method, in a focus detection device comprising an image sensor that outputs an image signal by subjecting subject light that passes through a photographing optical system to photoelectric conversion, and that performs focus detection by calculating an evaluation value representing contrast based on the image signal, while executing a scan operation to change focus of an image plane of the image sensor to change, comprising detecting positional change of the focus detection device, setting running time for restricting focus movement range of the scan operation based on the positional change, and performing focus detection by restricting focus movement range of the scan operation based on the running time.

A non-transitory computer-readable medium of a third aspect of the present invention, storing a processor executable code, which when executed by at least one processor, the processor being provided within a focus detection device, the focus detection device comprising an image sensor that outputs an image signal by subjecting subject light that passes through a photographing optical system to photoelectric conversion, and the focus detection device performing focus detection by calculating an evaluation value representing contrast based on the image signal, while executing a scan operation to change focus of an image plane of the image sensor to change, performs a focus detection method, the focus detection method comprising detecting positional change of the focus detection device, setting running time for restricting focus movement range of the scan operation based on the positional change, and performing focus detection by restricting focus movement range of the scan operation based on the running time.

BRIEF DESCRIPTION OF THE DRAWINGS

FIG. 8A and FIG. 8B are drawings showing a case of shooting a running race and a case of shooting a playground rope swing, with the camera of one embodiment of the present invention.

DETAILED DESCRIPTION OF THE PREFERRED EMBODIMENTS

Figure 1:
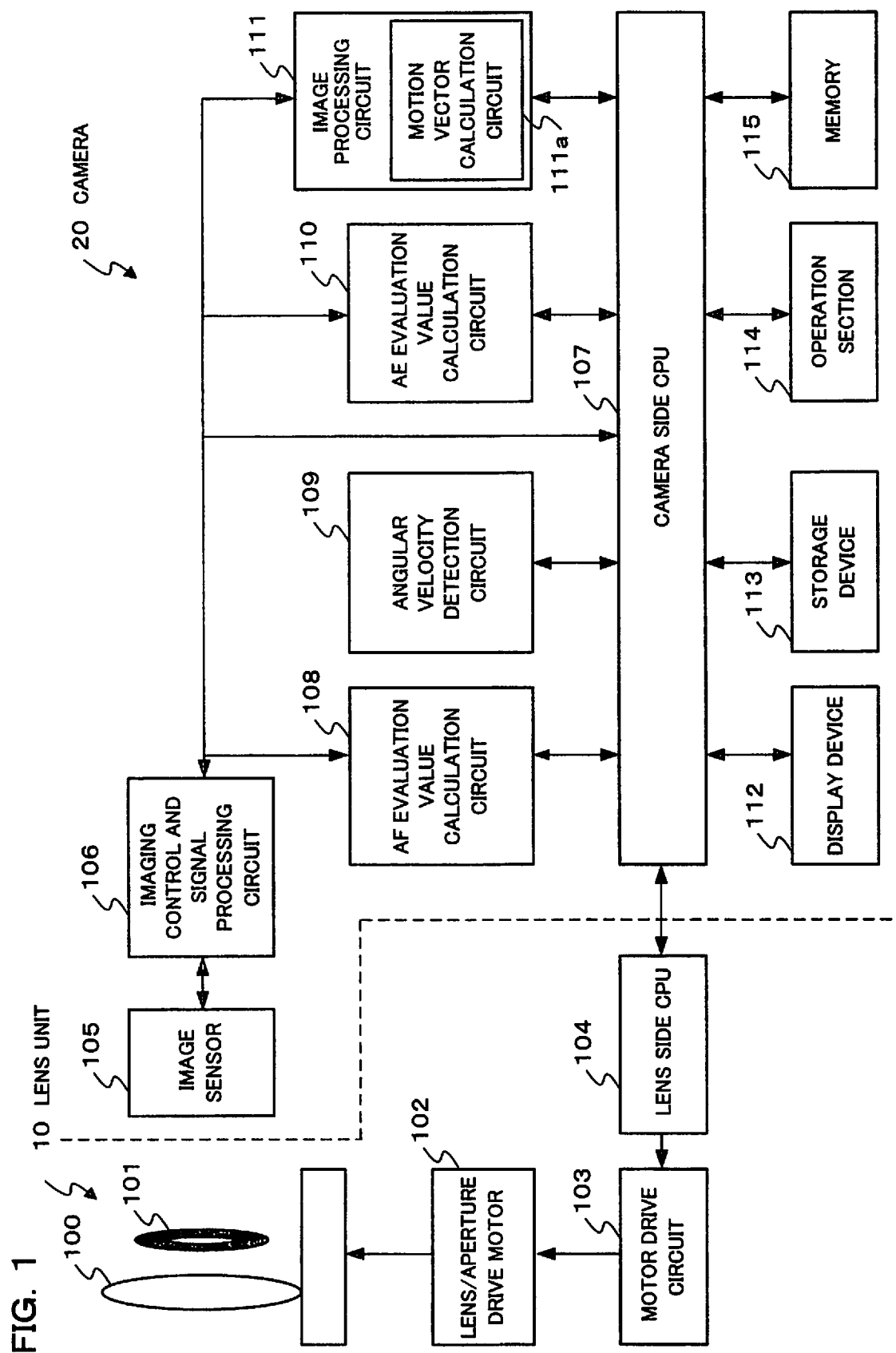
FIG. 1 is a block diagram mainly showing electrical circuits of a camera of one embodiment of the present invention.

In the following, an example applied to a camera will be described as a focus adjustment device of a preferred embodiment of the present invention. This camera is a digital camera, and has an image sensor, with a subject image being converted to image data by this image sensor, and the subject image being subjected to live view display on a display section arranged on the rear surface of the camera body based on this converted image data. A user determines composition and photo opportunity by looking at the live view display. At the time of a release operation image data is stored in a storage medium. Also, image data that has been stored in the storage medium can be subjected to playback display on the display section if playback mode is selected. Also, this focus detection device performs focus detection by calculating evaluation values representing contrast based on the image signal, while executing a scan operation to change focus of an image plane of the image sensor.

With contrast AF for a still picture, in order to prevent losing sight of a subject due to the subject moving out of an AF target area (hereafter referred to as "lost subject"), in a case where a low contrast state comes about and direction determination is not defined, it is made easy to recover from a lost subject state by restricting a scan drive range. Here, scan drive range is a range in which the focus lens is driven at the time of contrast AF. This type of restriction of the scan drive range is effective in preventing losing sight of a subject due to a lost subject, but in a case where a subject recedes rapidly at the close-up end tracking of the subject becomes impossible. Specifically, in the case of a lost subject a subject distance is not changing significantly, and so if scan drive range is restricted, if the photographer swings the camera in search of the subject it is possible to capture the subject before too long. On the other hand, in a case where a subject is receding rapidly at the close-up end subject distance changes significantly, and so if scan drive range is restricted it will not be possible to focus on that subject. Therefore, with this embodiment, a time for which restriction of the scan drive range continues is changed in accordance with camera movement and in-focus history information.

Specifically, the following is performed. As a scene in which a lost subject occurs, there are many cases where a panning operation is performed following a subject. In this case, since restriction of scan drive range is effective, in the event that a pan operation has been detected the running time for which scan drive range is restricted is made long. On the other hand, in a scene such as a playground rope swing or a swing in which rapid receding occurs at the close-up end, there are few pan operations and it unlikely that panning operations will occur even with a lost subject. Therefore, since restriction of scan drive range is not effective, in a case where it has been detected that there is no pan operation or that a pan operation is small, the running time for which scan drive range is restricted is made short.

FIG. 1 is a block diagram mainly showing the electrical structure of a camera of one embodiment of the present invention. The camera of this embodiment is roughly separated into a lens unit 10 and a camera body 20. It should be noted that although the camera of this embodiment is a so-called lens interchangeable type camera that has a lens unit 10 fitted to the camera body 20, the lens unit 10 and the camera body 20 may also be constructed integrally. In this case, a lens side CPU 104 and a camera side CPU 107 may also be integrated.

The lens unit 10 comprises a photographing lens 100, an aperture 101, a lens/aperture drive motor 102 for driving the lens and the aperture, a motor drive circuit 103, and the lens side CPU 104. Also, the camera body 20 comprises an image sensor 105, an imaging control section and signal processing circuit 106, the camera side CPU 107, an AF (Auto Focus) evaluation value calculation circuit 108, an angular velocity detection circuit 109, an AE (Auto Exposure) evaluation value calculation circuit 110, an image processing circuit 111, a display device 112, a recording device 113, an operation section 114, and memory 115.

The photographing lens 100 has a plurality of optical lenses for forming a subject image. The plurality of optical lenses include a focus lens, and have a single focus lens, or a zoom lens. The aperture 101 is arranged on the optical axis of the photographing lens 100, close to an exit pupil of the photographing lens 100, and adjusts incident light amount and depth of focus. The aperture 101 and the focus lens within the photographing lens 100 are controlled by the camera side CPU 107, lens side CPU 104, motor drive circuit 103, and motor 102, and realize focus adjustment and aperture adjustment. It should be noted that the lens side CPU 104 interprets control commands that have been received from the camera side CPU 107, and controls the photographing lens 100 and the aperture 101.

The image sensor 105 is arranged on the optical axis of the photographing lens 100, and converts a subject image that has been formed by the photographing lens 100 to image data. Specifically, the image sensor 105 has pixels, that include photodiodes, arranged in a two-dimensional matrix, and accumulate charge in accordance with received light amount. Charge accumulation control and image signal readout control etc. for the image sensor 105 are performed by the imaging control and signal processing circuit 106 that has been connected to output of the image sensor 105. The image sensor 105 functions as an image sensor that subjects subject light that has passed through a photographing optical system to photoelectric conversion and outputs an image signal.

The imaging control and signal processing circuit 106 performs amplification processing and AD conversion etc. of an image signal that has been read out from the image sensor 105, and outputs image data. Image data that has been read out from the image sensor 105 and subjected to processing by the imaging control and signal processing circuit 106 is output to the camera side CPU 107, AF evaluation value calculation circuit 108, AE evaluation value calculation circuit 110, and image processing circuit 111.

The camera side CPU 107 is a processor, and has a CPU (Central Processing Unit) and peripheral circuits. The camera side CPU 107 controls each section within the camera body 20 in accordance with programs that are stored in the memory 115. The camera side CPU 107 also communicates with the lens side CPU 104 within the lens unit 10, and controls each section within the lens unit 10 by means of the lens side CPU 104. The camera side CPU 107 also receives various adjustment values for the lens unit 10, and status information of the focus lens and the aperture, from the lens side CPU 104.

Figure 4:
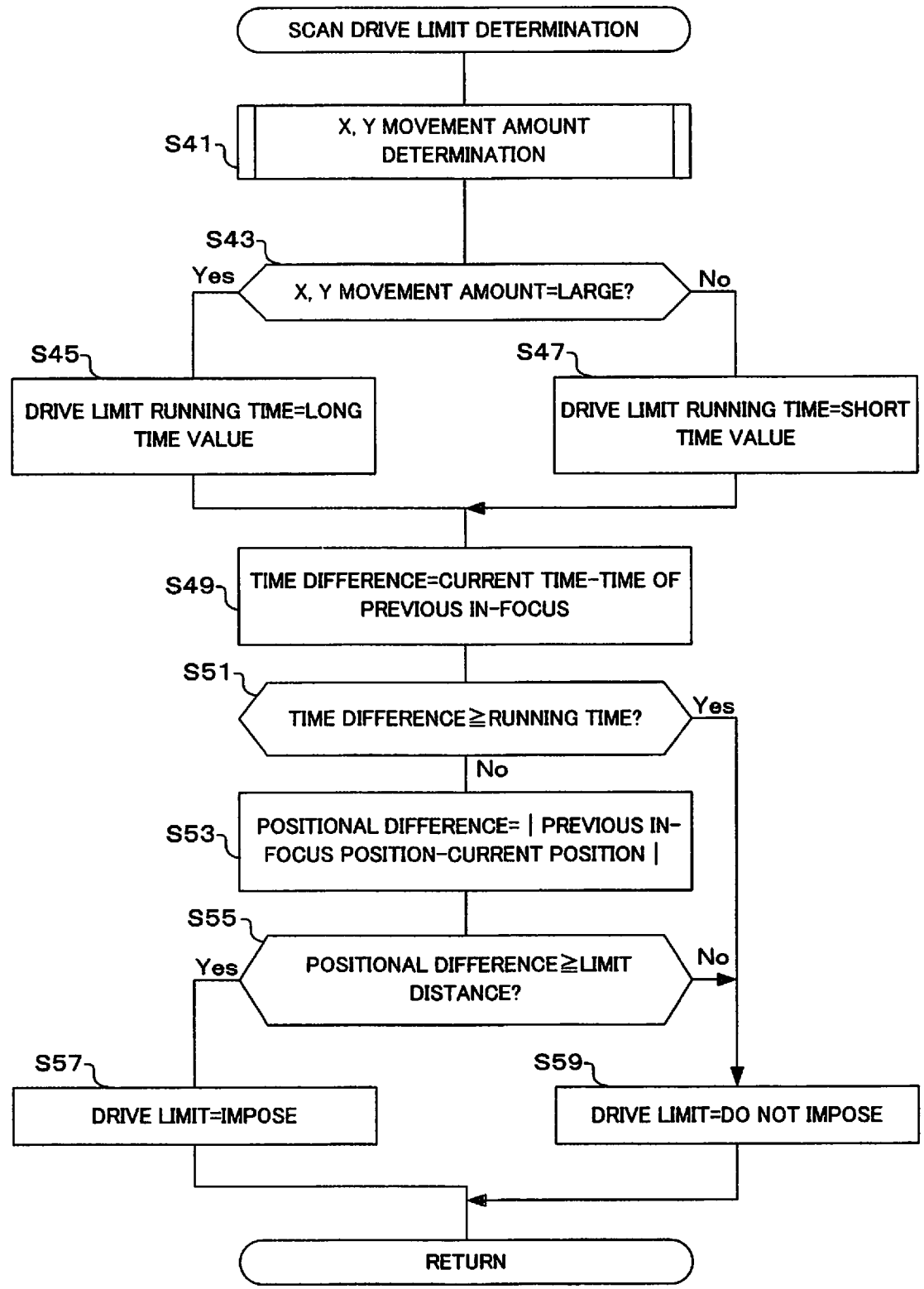
FIG. 4 is a flowchart showing a scan drive limit determination operation, in the camera of one embodiment of the present invention.

Also, the camera side CPU 107 (processor) functions as a running time setting section that sets running time for which focus movement range for a scan operation is restricted, based on positional change of the focus detection device (refer to S45 and S47 in FIG. 4). Also, the running time setting section makes the running time longer as positional change increases (refer to S43 Yes-S45 in FIG. 4). With this embodiment, in a case such as where the user is panning by following so as to position the subject within an AF target (pan operation), restriction time for the scan drive range is made long (refer to lost subject region LSR, and restriction time Tlim in FIG. 9B). For example, in a case where the user changes a direction in which the camera is facing using a pan operation, and captures the subject within the AF target a second time, then since the possibility of subject distance being substantially the same as before the subject was lost as a result of moving out of the AF target is high, scan drive range is restricted. On the other hand, in a case such as where the subject is contained within a specified range within a screen and only subject distance changes, for example, in a case where a subject of a child playing on a playground rope swing is photographed from the front, then since it is unlikely that the subject will move out of the AF target the amount by which the user changes the direction in which the camera is facing is small. The time for which restriction of scan drive range is restricted is therefore made short (refer to Tlim in FIG. 10B).

Figure 3A:
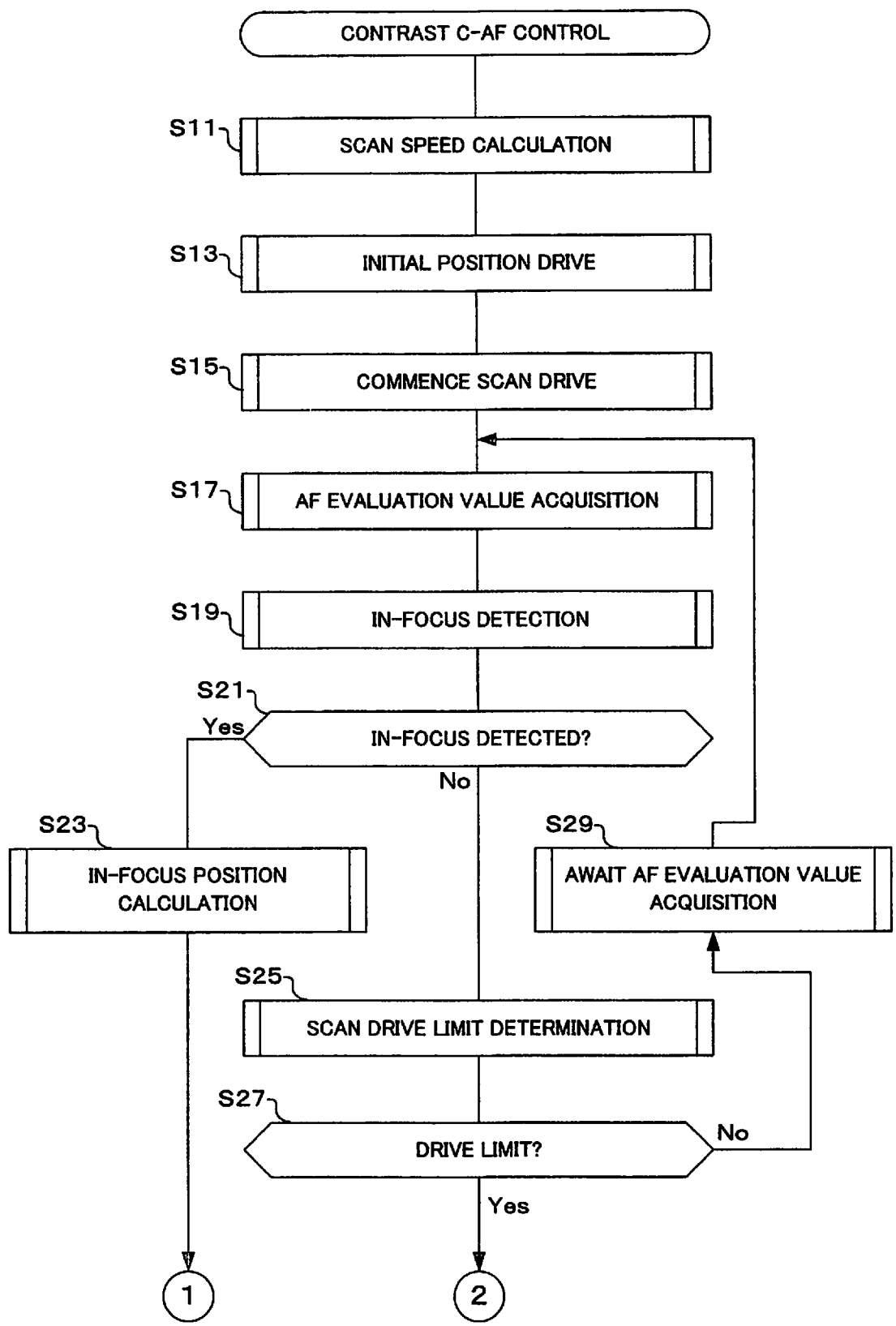
FIG. 3A and FIG. 3B are flowcharts showing operation for contrast C-AF control of the camera of one embodiment of the present invention.

Also, the camera side CPU 107 (processor) functions as a control section for performing focus detection by restricting focus movement range of a scan operation based on running time (refer, for example, to S27 in FIG. 3A). The control section acquires time when focus is reached and in-focus position in a case where a scan operation has been repeatedly executed and in-focus has been detected, and in a case where an elapsed time from a time when focus was achieved previously to the current time is less than the running time, restricts focus movement range from a previous in-focus position to a specified amount (refer, for example, to S49, S51 No, S53, and S55 in FIG. 4). The control section removes restriction to focus movement range from the previous in-focus position in a case where an elapsed time from the time focus was previously achieved to the current time is greater than or equal to the running time (refer, for example, to S51 Yes→S59 in FIG. 4).

The AF evaluation value calculation circuit 108 has a filter circuit, and extracts high-frequency components of image data that has been output from the image sensor 105 using the filter circuit, and calculates AF evaluation value. An AF evaluation value is calculated based on image data corresponding to an AF target. AF evaluation value that has been calculated is output to the camera side CPU 107. The AF evaluation value calculation circuit 108 functions as an evaluation value calculation section that calculates an evaluation value that represents contrast, based on an imaging signal output from the image sensor.

The angular velocity detection circuit 109 has an angular velocity sensor such as a gyro, and a processing circuit that processes an output signal from this angular velocity sensor. The angular velocity detection circuit 109 detects angular velocity that has been applied to the camera, such as camera shake of the user who is holding the camera, and movement for tracking a subject in order to perform panning shooting. The angular velocity detection circuit 109 outputs a detection result to the camera side CPU 107. It is possible to calculate movement amount of the camera based on angular velocity (refer to FIG. 5).

The angular velocity detection circuit 109 functions as a positional change detection section that detects positional change of the focus detection device. The positional change detection section has an angular velocity detection section (angular velocity sensor), and detects positional change based on angular velocity (refer to FIG. 5, for example). It should be noted that as well as detecting angular velocity, it is possible for the positional change detection section to detect physical position change of the focus detection device, such as acceleration using an acceleration sensor and angular acceleration using an angular acceleration sensor. The angular velocity detection circuit 109 functions as a positional change detection circuit that detects positional change of the focus detection device. The positional change detection circuit detects angular velocity applied to the focus detection device and detects positional change based on the angular velocity.

The AE evaluation value calculation circuit 110 has a brightness value calculation circuit, and calculates brightness value at the time of acquisition of image data for focus adjustment by correcting brightness value of a photometric domain at the time of acquisition of live view image data, and calculates exposure time (Tv) and aperture value (Av) so that exposure at the time of live view display and at the time of focus adjustment becomes appropriate. A brightness value Y may be temporarily stored in a storage section such as the memory 115 and acquired by the camera side CPU 107, and a value that has been calculated by the AE evaluation value calculation circuit 110 may be acquired directly by the camera side CPU 107.

Figure 7:
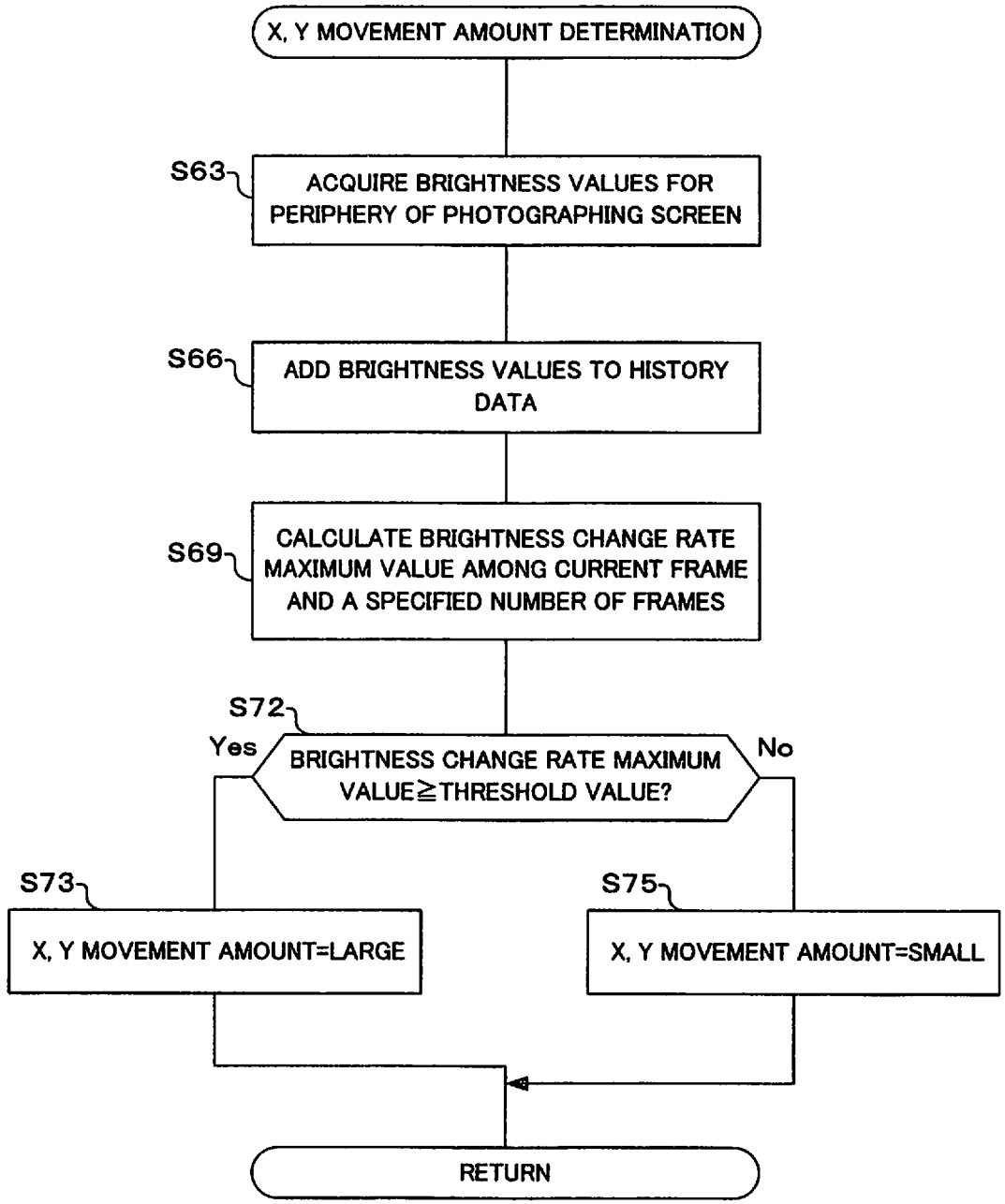
FIG. 7 is a flowchart showing operation of a second modified example of X, Y movement amount determination, in the camera of one embodiment of the present invention.

Movement amount of the camera may be calculated using brightness values within and around the AF target (refer to FIG. 7). For example, in a case where a person in a race is being photographed from the side, if that person moves out of an AF target within the screen of the camera an image acquired within the AF target changes from the person to the background, and accompanying this change in image there will be a change of brightness value within the AF target. At peripheral area of the photographing screen also, the brightness value of the image similarly changes in accordance with brightness of the background. As a result, it is possible to detect positional change of the camera based on change in AE evaluation value (brightness value). The AE evaluation value calculation circuit 110 functions as a positional change detection section that detects positional change of the focus detection device. The positional change detection section detects positional change using brightness change based on output of the image sensor (refer to FIG. 7, for example). The AE evaluation value calculation circuit 110 functions as a positional change detection circuit that detects positional change of the focus detection device. The positional change detection circuit detects positional change using brightness change based on output of the image sensor.

The image processing circuit 111 performs various image processing, such as demosaicing processing, tone conversion processing, white balance adjustment, edge processing etc. for image data that has been read out from the image sensor 105. Image data that has been subjected to image processing is stored in a storage medium that is detachable with respect to the camera body 20, provided within the recording device 113.

A motion vector calculation circuit 111a is arranged within the image processing circuit 111. The motion vector calculation circuit 111a calculates motion vectors of the subject using a plurality of image data that have been read out from the image sensor 105. A motion vector represents direction and magnitude of movement of a subject within an image. The motion vector calculation circuit 111a outputs motion vectors to the camera side CPU 107. Movement amount of the camera may also be calculated based on motion vectors for within an AF target and peripheral parts of a photographing screen (refer to FIG. 6, for example). The motion vector calculation circuit 111a functions as a positional change detection section that detects positional change of the focus detection device. The positional change detection section detects positional change using motion vectors based on output of the image sensor (refer to FIG. 6, for example). The motion vector calculation circuit 111a functions as a positional change detection circuit that detects positional change of the focus detection device. The positional change detection circuit detects positional change using motion vectors based on output of the image sensor.

The display device 112 is a display, and has, for example, a display panel that is arranged on a rear surface of the camera body 20, and/or an electronic viewfinder with which it is possible to view a monitor through an eyepiece. A live view image, playback image of an image that has been stored, and menu screens etc. are displayed on this display panel and electronic viewfinder.

The recording device (storage device) 113 is an electrically rewritable storage medium. The storage medium may be removable from the camera body, or may be fixed to the camera body. Image data that has been subjected to image processing is stored in this storage medium. The recording device 113 also performs readout of image data that has already been stored.

The operation section 114 is an interface for the user to input instructions to the camera, and has operation members such as a release button, power switch, touch panel etc. The release button has a 1st release switch that is turned on if the user performs a half press operation, and a 2nd release switch that is turned on if the user performs a full press operation. The operation section 114 detects operating states of the operation members and outputs results of detection to the camera side CPU 107. If the user operates the operation section 114, then based on this operating state the camera side CPU 107 controls the AF evaluation value calculation circuit 108, angular velocity detection circuit 109, AE evaluation value calculation circuit 110, image processing circuit 111, memory 115 etc., and performs focus adjustment, exposure control, and image processing etc. For example, if the 1st release switch is turned on, photometry and ranging are commenced, and if the 2nd release switch is turned on actual exposure is commenced (refer to S3 and S5 in FIG. 2). Also, if the user operates the operation section 114, it is possible to perform setting of various modes, such as, for example, C-AF (continuous AF) mode, and rapid shooting mode.

The memory 115 has an electrically rewritable nonvolatile memory, and stores programs that are used by the camera side CPU 107. The memory 115 also stores various adjustment values that are used in the camera.

Next, C-AF control (focus adjustment operation) of this embodiment will be described using the flowcharts shown in FIG. 2 to FIG. 7. This flow is executed by the camera side CPU 107 controlling each of the sections and circuits shown in FIG. 1, based on programs that have been stored in the memory 115. It should be noted that in this flow, operation for when rapid shooting mode and C-AF (continuous AF) mode have been set is shown.

Figure 2:
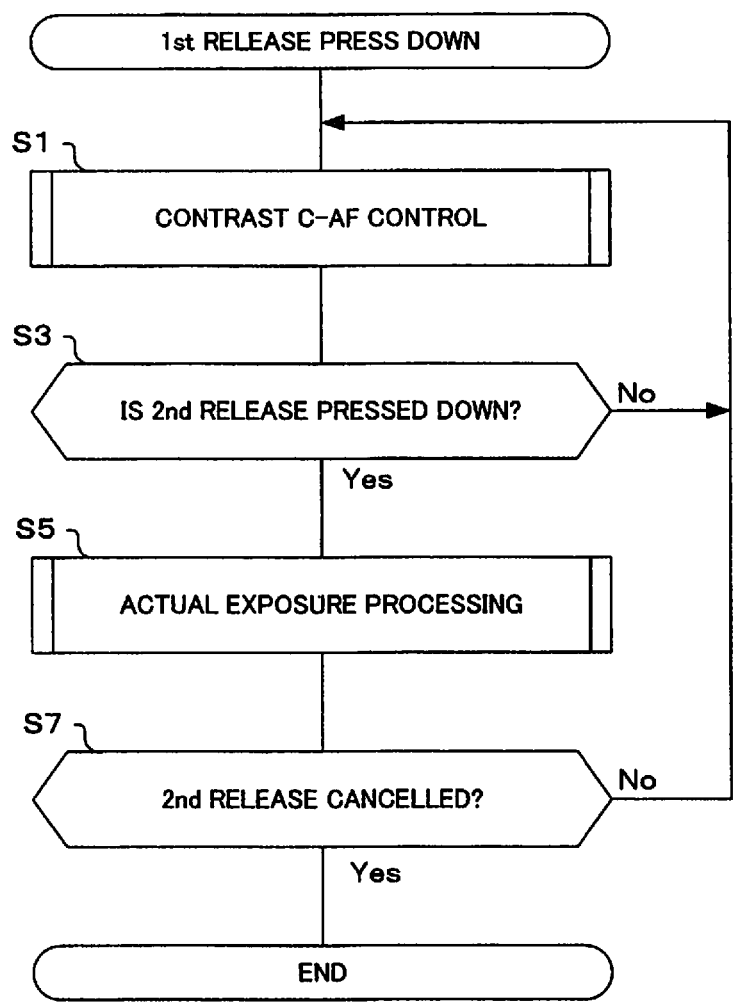
FIG. 2 is a flowchart showing operation when a 1st release is pressed down, in the camera of one embodiment of the present invention.

If the user presses the release button down halfway, the flow for 1st release depression (1st release press down) shown in FIG. 2 is commenced, and first, contrast C-AF control is executed (S1). Contrast AF control is AF control whereby the AF evaluation value calculation circuit 108 calculates an AF evaluation value corresponding to contrast of an image every time image data for one frame is output, while moving the focus lens, and makes a position at which this AF evaluation value becomes a peak an in-focus position. Contrast C-AF control detects in-focus position of the focus lens by performing contrast AF control once, contrast AF control is repeatedly performed. Even in a case where a subject moves, contrast C-AF control performs control so that the focus lens is always capable of moving to an in-focus position. Also, in step S1, live view display is performed on the display device 112 based on image data that has been acquired by the image sensor 105. In this way, contrast C-AF control continually focuses on a subject, and as a result a subject is subjected to live view display in a focused state using an image corresponding to an AF evaluation value peak. Detailed operation of this contrast C-AF control will be described later using FIG. 3A and FIG. 3B.

If contrast C-AF control has been performed in step S1, it is next determined whether or not the 2nd release has been pressed down (S3). The user presses the release button within the operation section 114 fully in a case where composition has been determined and it has been determined to perform actual shooting. If the release button is pressed down fully a 2nd release switch on signal is output to the camera side CPU 107. In this step, whether or not the 2nd release has been pressed down is determined based on the state of the 2nd release switch. If the result of this determination is that the 2nd release has not been pressed down, step S1 is returned to and contrast C-AF control is executed.

On the other hand, if the result of determination in step S3 is that the 2nd release has been pressed down, the actual exposure processing is executed (S5). Here, the aperture 101 is closed down to a set aperture value, and after a mechanical shutter has been closed once, an open state is entered for the duration of a set shutter time, and then the shutter is closed. During this shutter time, a subject image that has been formed on the image sensor 105 is subjected to photoelectric conversion, and the image sensor 105 outputs image data. The image processing circuit 111 performs image processing of image data, and stores image data that has been subjected to image processing in the recording device 113. It should be noted that in a case where the camera 20 is not provided with a mechanical shutter exposure time is controlled by an electronic shutter.

If the actual exposure processing of step S5 has been completed, it is next determined whether or not the 2nd release is cancelled (S7). When actual exposure has been completed, if the user has finished shooting the fully pressed state of the release button will be removed. In this case, the 2nd release switch is turned off. Further, if the user has also released the half press state the 1st release switch is turned off, that is, the 2nd release is cancelled.

If the result of determination in step S7 is that the 2nd release has not been cancelled, and the 1st release switch is still on, processing returns to step S1, contrast C-AF control continues, a subject is followed and focused on, and live view display is performed. Also, if the 2nd release is pressed down actual exposure processing is executed. If the 2nd release switch is turned on at the time of the determination of step S7, rapid shooting is executed with C-AF control. On the other hand, if the result of determination in step S7 is that 2nd release has been cancelled, this flow is terminated.

Figure 3B:
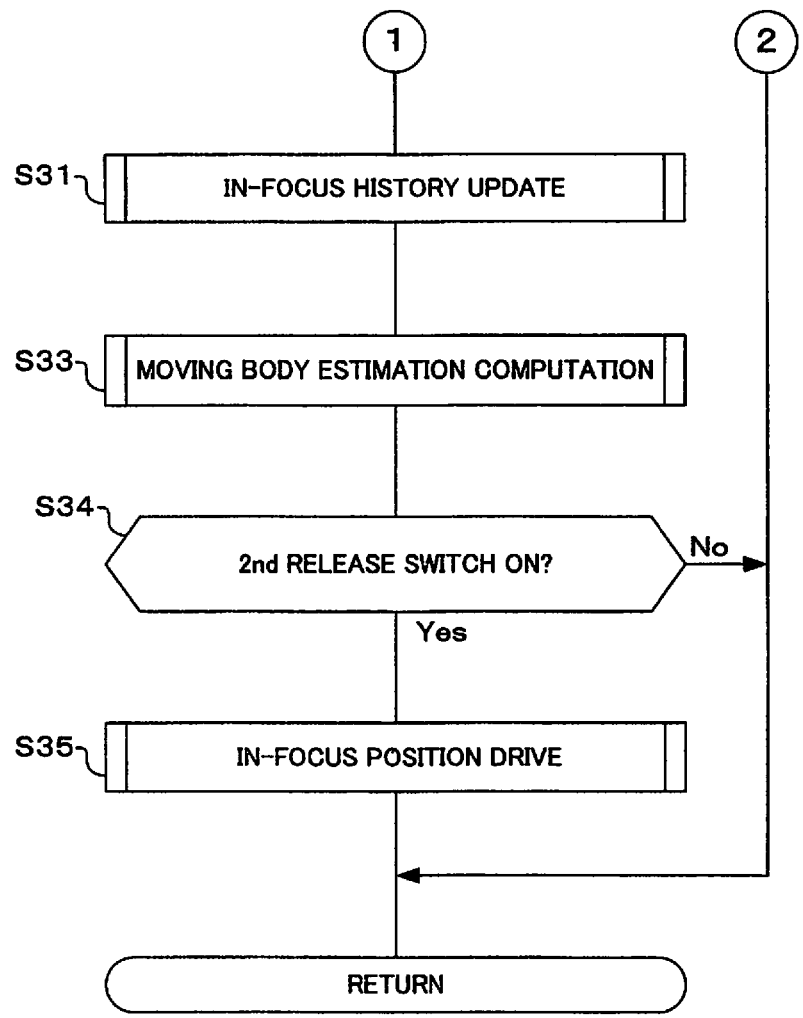

Next, detailed operation of the contrast C-AF control in step S1 will be described using the flowcharts shown in FIG. 3A and FIG. 3B. If the flow for contrast C-AF control in FIG. 3A is commenced, then first of all scan speed is calculated (S11). With contrast C-AF, the focus lens is moved by a specified amount (refer to FIG. 8A to FIG. 9B), and at that time the AF evaluation value calculation circuit 108 calculates AF evaluation value every time image data for one frame is output. In this step the camera side CPU 107 calculates scan speed when moving the focus lens. This scan speed is made a value such that scan drive amount for a single period of an image sensor vertical synchronization signal becomes an amount that is specified number of times $F\delta$. It should be noted that F is aperture value of the aperture 101, $\delta$ is permissible circle of confusion, and $F\delta$ is permissible depth.

Once scan speed has been calculated, the focus lens is next driven to an initial position (S13). Here, the camera side CPU 107 calculates initial position that is a focus lens position shifted by an amount that is a second specified number of times Fδ with respect to the current position of the focus lens, and drives the focus lens to this initial position by means of the lens side CPU 104.

Once the focus lens has been driven to an initial position, next, scan drive is commenced (S15). Here, the camera side CPU 107 commences scan drive of the focus lens from the initial position (refer to S13) towards a subject estimated position by means of the lens side CPU 104, at a scan speed that has been calculated (refer to S11). The subject estimated position is an estimated position using moving body prediction for a subject that moves, as will be described later. In a case where a result of moving body prediction has not yet been produced, the focus lens is positioned a specified distance from the initial position.

If scan drive has commenced, an AF evaluation value is acquired (S17). Here, the AF evaluation value calculation circuit 108 calculates AF evaluation value using image data from the image sensor 105, and outputs the evaluation value to the camera side CPU 107. The camera side CPU 107 associates focus lens position and time information with the AF evaluation value that has been acquired, and saves and retains as AF evaluation value history data in the memory 115 for every frame of image data.

Next, focus detection is performed (S19). Here, the camera side CPU 107 uses AF evaluation value history data to determine that an in-focus position has been detected if a rate of fall from a maximum value of AF evaluation value is greater than or equal to a predetermined value, and determines that an in-focus position has not yet been detected if this condition is not satisfied. Information as to whether in-focus position has been detected or not detected is then made to correspond with and added to AF evaluation value, focus lens position and time information for every frame of AF evaluation value history data, and stored in the memory 115.

Next it is determined whether or not in-focus has been detected (S21). Here, the camera side CPU 107 determines whether or not in-focus position has been detected based on result of detection in step S19.

If the result of determination in step S21 is that in-focus position has not been detected, scan drive limit determination is performed (S25). Here, the camera side CPU 107 performs determination as to whether or not scan drive range will be restricted at the time of performing scan drive. Specifically, a positional difference and time difference are obtained from time of detection of in-focus position the previous time to the current time, and if this time difference is within a scan drive limit running time, and the positional difference is greater than or equal to a drive limit distance, scan drive limit is imposed. At this time, length of the drive limit running time is determined in accordance with magnitude of angular velocity that has been detected by the angular velocity detection circuit 109. Detailed operation of this scan drive limit determination will be described later using FIG. 4.

If scan drive limit determination has been performed, it is next determined whether or not there is a drive limit (S27). Here, in step S25 the camera side CPU 107 performs determination based on whether drive limit was imposed (refer to S57 in FIG. 4), or whether drive limit was not imposed (refer to S59 in FIG. 4).

If the result of determination in step S27 is that drive limit is not imposed, then acquisition of the next AF evaluation value is awaited (S29). Here, the AF evaluation value calculation circuit 108 waits until a state is entered where it is possible to calculate AF evaluation value for the next frame from the image sensor 105. If a state where it is possible to acquire the next AF evaluation value is entered, processing advances to the previously described step S17. In this way, if it is not possible to detect in-focus position during a scan operation (S21 No), and drive limit is not imposed (S27 No), a processing loop of steps S29, S17, S19, S21 No, S25, and S27 No is repeatedly executed until it is possible to detect in-focus position (S21 Yes). On the other hand, if a result of determination as to whether or not there is a drive limit in step S27 is that drive limit has been imposed, the flow for contrast C-AF control is terminated and the originating flow is returned to.

Returning to step S21, if the result of determination in step S19 is that in-focus has been detected, then next a detailed in-focus position is calculated (S23). Here, the camera side CPU 107 calculates AF evaluation value peak by secondary function approximation using AF evaluations values and focus lens positions for a total of three points, being the frame in which AF evaluation value is a maximum value, and a frame before and a frame after that. In-focus time is also calculated by linear interpolation. Focus lens position corresponding to an AF evaluation value peak position is an in-focus position.

If in-focus position has been calculated in step S23, next, the in-focus history is updated (S31). Here, in the event that in-focus position has been calculated in step S23, in-focus position that has been calculated and information on time are saved and held for every occurrence of in-focus as history data. This history data is stored in the memory 115.

If in-focus history has been updated, next, moving body estimation computation is executed (S33). Here, the camera side CPU 107 references the in-focus history and estimates in-focus position for at the time of actual exposure (refer to S5 in FIG. 2) using least squares approximation, using in-focus position and the time of that in-focus position for a plurality of previous times.

Once moving body estimation computation has been carried out, it is next determined whether or not a 2nd release switch is on (S34). If the result of this determination is that the 2nd release switch is on (S34 Yes), the focus lens is driven to the in-focus position (S35). Here, the camera side CPU 107 drives the focus lens to the in-focus position that was calculated using moving body estimation computation in step S33 by means of the lens side CPU 104. If the focus lens has been driven to the in-focus position, or if the 2nd release switch is off (S34 No), then the flow for contrast C-AF control is terminated and the originating flow is returned to.

Next, detailed operation of the scan drive limit determination of step S25 (refer to FIG. 3A) will be described using the flowchart shown in FIG. 4. In a case where a subject has moved out of an AF target due to lost subject, then even if a scan operation continues using C-AF it will become difficult to continue focusing on the subject. On the other hand, in a case where the subject is in front of the camera and is receding rapidly, it is unlikely that lost subject will arise, and it is possible to continue tracking and focusing on the subject by continuing a scan operation using C-AF. With this embodiment therefore, time for which restriction of scan drive range continues is changed based on movement amount of camera movement such as at the time of a pan operation. In this scan drive limit determination of FIG. 4, whether or not scan drive limit is imposed is set.

If the flow for scan drive limit determination of FIG. 4 is commenced, X, Y movement amount is first determined (S41). Here, whether X, Y movement amounts, which are amounts of movement in the X (horizontal) direction and Y (vertical) direction, are large or small is determined based on motion amount of the camera body that has been detected by the angular velocity detection circuit 109. Detailed operation of this X, Y movement amount determination will be described later using FIG. 5. It should be noted that as well as performing X, Y movement amount determination by detecting physical movement amounts of the camera using the angular velocity detection circuit 109, it is also possible to calculate motion vectors based on image data and determine X, Y movement amount based on the motion vectors (refer to FIG. 6), and it is also possible to determine X, Y movement amount based on brightness value of the subject (refer to FIG. 7).

If X, Y movement amount determination has been performed in step S41, it is next determined whether or not X, Y movement amount is large (S43). With the X, Y movement amount determination, since it is determined whether the X, Y movement amount is large or small (refer to S73 and S75 in FIG. 5), in this step the camera side CPU 107 performs determination based on the result of this determination.

If the result of determination in step S43 is that X, Y movement amount is large, the drive limit running time is set to a long time value (S45). If the X, Y movement amount is large, it is assumed to be a case where the user is tracking a subject so as to capture the subject within an AF target, by performing a panning operation of the camera body. In this type of case, it is easy for a lost subject to arise, restricting scan drive range is effective, and so the camera side CPU 107 sets the time for which the scan drive range is restricted, namely the drive limit running time, to a comparatively long time.

On the other hand, in the event that X, Y movement amount is small, the drive limit running time is set to a short time value (S47). If the X, Y movement amount is small, as well as a case where the user is aiming at a subject holding the camera firmly, it is expected, for example, that a subject in conditions such that a pan operation becomes small is being aimed at, such as shooting a playground rope swing having a subject rapidly receding at the close-up end, or shooting a scene of a playground swing. In this type of case, a lost subject does not occur, and restricting the scan drive range is not particularly effective, and so the camera side CPU 107 sets the drive limit running time to a comparatively short time. It should be noted that as a short time value for drive limit running time, 0 may also be used.

If a drive limit running time value has been set in steps S45 or S47, next a time difference is calculated from a difference between current time with scan operation in progress, and the time of the previous in-focus (S49). Time of the previous in-focus is a time at which an in-focus position was detected during scan operation the previous time, and is stored in the memory 115. Here, the camera side CPU 107 calculates "time difference=current time-previous in-focus time". With C-AF control, if peak of AF evaluation value can be detected, the time at which this in-focus position was detected is stored (refer to S19 in FIG. 3A). With this step S49, a difference between a time when the in-focus position was most recently detected, and the current time, is calculated, that is, elapsed time from the time when a most recent in-focus position was detected is calculated.

If time difference has been calculated in step S49, it is next determined whether or not the time difference is greater than or equal to the drive limit running time (S51). Here, the camera side CPU 107 determines whether or not the time difference that was calculated in step S49 is greater than or equal to the drive limit running time that was set in steps S45 or S47.

If the result of determination in step S51 is that time difference is less than running time, next, a position difference is calculated from an absolute value of a difference between previous in-focus position and current position (S53). Here, the camera side CPU 107 calculates "positional difference=|previous in-focus position-current position|". The previous in-focus position is an in-focus position (focus lens position) that was most recently detected by a scan operation, and current position is the current focus lens position during a scan operation. With this embodiment, in a case where an elapsed time from the time of previous in-focus to the current time is less than the drive limit running time, scan drive range from the previous in-focus position is restricted to a limit distance. In this step, in order to determine whether or not the scan drive range will be restricted, by how far the current focus lens position is separated from the previous in-focus that was detected is calculated.

If positional difference has been calculated in step S53, it is next determined whether or not the positional difference is greater than or equal to the limit distance (S55). Here, the camera side CPU 107 determines whether or not positional difference that was calculated in step S53 is greater than or equal to the limit distance. If the user is tracking a subject so as to capture the subject in an AF target using a pan operation, then the subject will often be at substantially the same distance, even if a subject moves out of an AF target. Therefore, the limit distance may be appropriately set taking into consideration the above conditions etc. For example, a scan drive distance for 5 to 9 frames (scan speed×frame number) may be made the limit distance.

If the result of determination in step S55 is that the positional difference is greater than or equal to the limit distance, imposing drive limit is set (S57). If imposing drive limit is set, position of the focus lens is restricted to a position that is a limit distance from the most recent in-focus position, and scan drive is stopped during operation (refer to lost subject region LSR and restriction time Tlim in FIG. 9B).

If the result of determination in step S55 is that the positional difference is less than the limit distance, or if the result of determination in step S51 is that time difference is greater than or equal to the drive limit running time, not imposing drive limit is set (S59). If not imposing drive limit is set, then the result of determination in step S27 in FIG. 3A is to advance to step S29, acquisition of AF evaluation value is awaited, and in-focus detection is performed (refer to S19 and S21). In the case of not imposing drive limit, AF evaluation value acquisition and in-focus detection are repeated, and in a case where an in-focus position has been detected (S21 Yes) by in-focus detection (S19), an in-focus position is calculated (refer to S23), moving body estimation computation is performed (refer to S33), and if the 2nd release is pressed down fully the focus lens is driven to the in-focus position (refer to S35).

If imposing drive limit has been set in step S57, or if not imposing drive limit has been set in step S59, the flow for scan drive limit determination is terminated and the originating flow is returned to.

Figure 5:
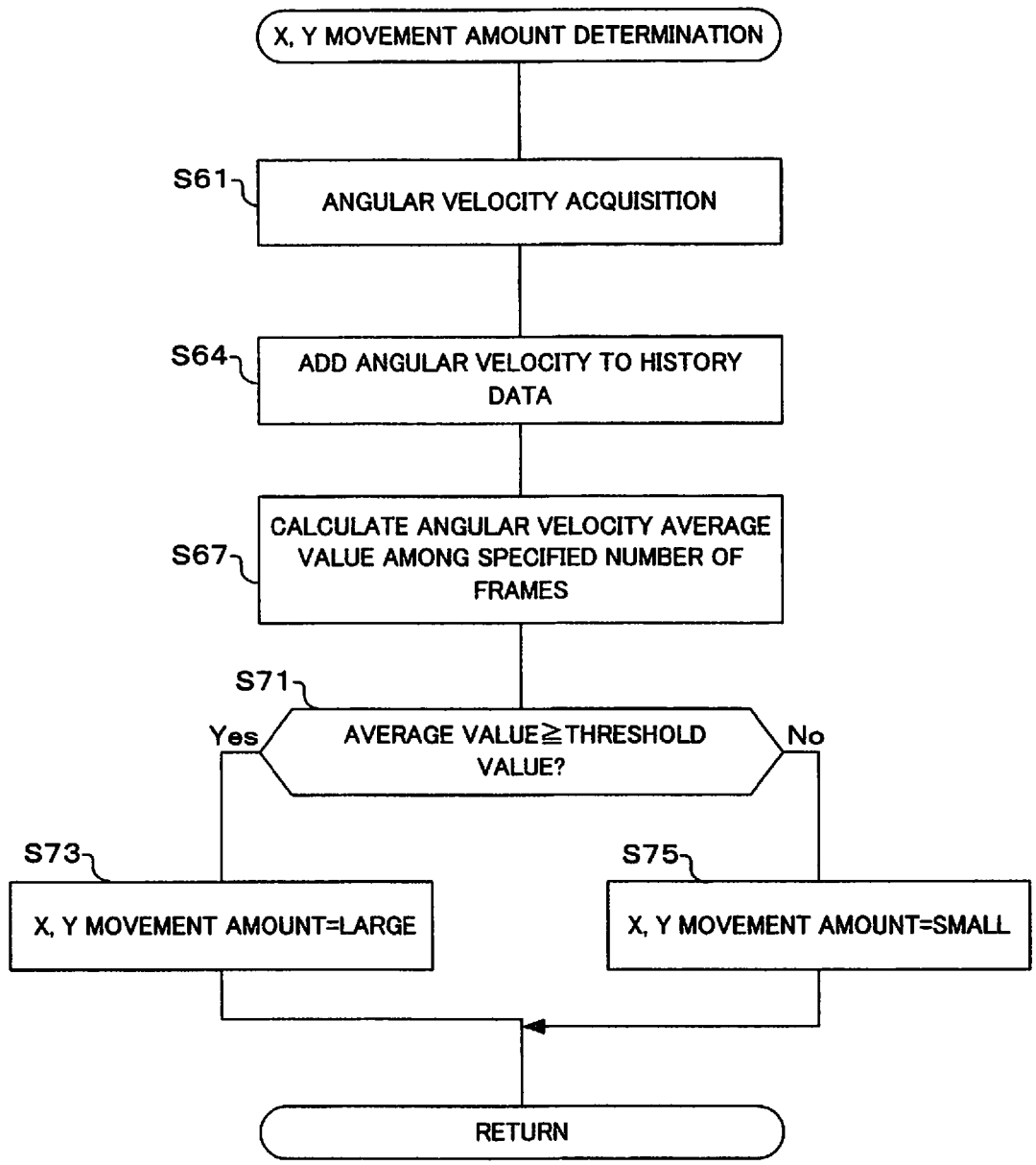
FIG. 5 is a flowchart showing operation of X, Y movement amount determination, in the camera of one embodiment of the present invention.

In this way, in the flow for scan drive limit determination, X, Y movement amount is determined based on angular velocity information obtained for every frame, stored as history data (refer to S41, and to S61 and S64 in FIG. 5, which will be described later). In the event that X, Y movement amount based on angular velocity within a fixed period is greater than or equal to a threshold value (significant pan or tilt are being performed), the drive limit running time is made long (refer to S45). In the event that angular velocity within a fixed period is smaller than the threshold value (significant pan or tilt are not being performed), the drive limit running time is made short (refer to S47). If elapsed time from the time of previous in-focus to the current time is less than the drive limit running time (S51 No), and positional difference from the previous in-focus position to the current position is greater than or equal to the drive limit distance, drive is restricted from the previous in-focus position to the limit distance (refer to S55 Yes, S57). Also, If the elapsed time from the previous in-focus position to the current time is greater than or equal to the drive limit running time, the drive limit is removed so that an AF operation can be performed tracking a subject using scan drive (refer to S51 Yes, S59).

It should be noted that although the X, Y movement amount has been classified as two values, namely large and small, in FIGS. 4 S41 and S43), more classifications may be set. A plurality of time values between a long time value and a short time value may be set for drive limit running time, in accordance with those classification. Also, in FIG. 4 one each of a running time (S51) and a limit distance (S55) are provided, but a plurality of running times and limit distances may be set, and shooting conditions, such as focal length and aperture value of the photographing lens, may be selectively switched in accordance with shooting parameters etc.

Next, detailed operation of the X, Y movement amount determination of step S41 (refer to FIG. 4) will be described using the flowchart shown in FIG. 5. As was described previously, with the flow for X, Y movement amount determination shown in FIG. 5, physical movement amount of the camera is detected using the angular velocity detection circuit 109. If the flow for X, Y movement amount determination is commenced, first, angular velocity is acquired (S61). Here, the angular velocity detection circuit 109 detects angular velocity corresponding to motion of the camera body, during exposure of one frame, and detection results are output to the camera side CPU 107.

Next, angular velocity is added to history data (S64). History data representing in-focus position and in-focus time etc. is stored in the memory 115 (refer to S31 in FIG. 3B). In this step, the camera side CPU 107 stores angular velocity that was acquired in step S61, and time of that angular velocity acquisition (corresponding to a frame). It should be noted that this history data may be history data that is separate to the history data storing in-focus position etc.

Next, an angular velocity average value for less than a specified number of frames is calculated (S67). Here, the camera side CPU 107 reads out angular velocities corresponding to a specified number of frames from history data, that was stored in step S64, and calculates an average value of the angular velocities that have been read out. In a case where the user performs panning shooting, there will be cases where change rate of that panning motion is not constant, and so average value of angular velocities corresponding to a specified number of frames is calculated.

Next, it is determined whether or not average value for angular velocity is greater than or equal to a threshold value (S71). Here, the camera side CPU 107 determines whether or not the average value for angular velocity that was calculated in step S67 is greater than or equal to the threshold value. If the user is performing panning shooting, then average value of angular velocity that has been detected by the angular velocity detection circuit 109 becomes large. A threshold value in this determination may be a value such that whether or not panning shooting is being performed can be determined. The threshold value may be set to about 2 to 4 degrees per second, for example. On the other hand, in cases such as where a child who is playing on a playground rope swing is photographed from the front, the user is pointing the camera in substantially the same direction, and so average value of angular velocity will not become larger than the threshold value.

If the result of determination in step S71 is that average value of angular velocity is greater than or equal to the threshold value, then large is set at the X, Y movement amount (S73). If large is set as the X, Y movement amount, then in the flow for scan drive limit determination (refer to FIG. 4) a long time value is set as the drive limit running time (refer to S45 in FIG. 4). It should be noted that if an average value of at least one of an X movement amount and a Y movement amount, of the X, Y movement amounts, is greater than or equal to the threshold value, it can be considered that a panning (tilt) operation is being performed, and so large is set as the X, Y movement amount.

On the other hand, if the result of determination in step S71 is that average value of angular velocity is less than the threshold value, then small is set as the X, Y movement amount (S75). If small is set as the X, Y movement amount, then in the flow for scan drive limit determination (refer to FIG. 4) a short time value is set as the drive limit running time (refer to S47 in FIG. 4).

If setting for X, Y movement amount has been set in step S73 or S75, the flow for X, Y movement amount determination is terminated and the originating flow is returned to.

Next, detailed operation of a first modified example of the X, Y movement amount determination of step S41 (refer to FIG. 4) will be described using the flowchart shown in FIG. 6. In the flow shown in FIG. 5, movement of the camera was detected by the angular velocity detection circuit 109 having a Gyro etc. By contrast, in the flow shown in FIG. 6, a motion vector is calculated using image data that has been acquired by the image sensor 105, and motion of the camera is detected based on this motion vector.

Figure 6:
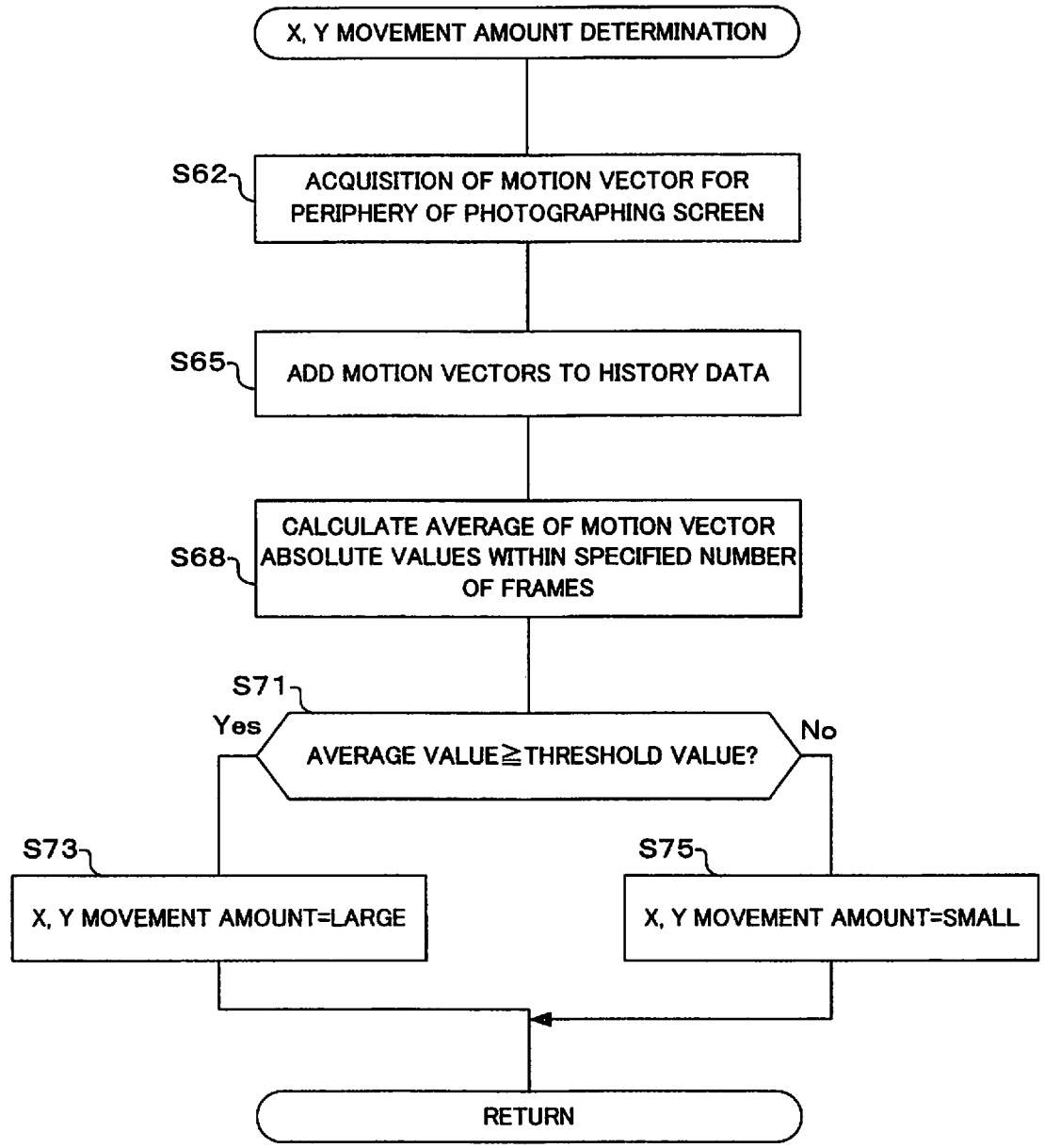
FIG. 6 is a flowchart showing operation of a first modified example of X, Y movement amount determination, in the camera of one embodiment of the present invention.

If the flow for X, Y movement amount determination shown in FIG. 6 is commenced, first, motion vectors at the periphery of a screen are acquired (S62). Here, a motion vector calculation circuit 111a within the image processing circuit 111 calculates motion vectors for the periphery of the screen based on a plurality of image data that have been acquired at different times by the image sensor 105.

Next, motion vectors are added to history data (S65). In this step, the camera side CPU 107 stores motion vectors that were acquired in step S62, and times of those motion vector acquisitions (corresponding to a frame) in the memory 115.

Next, an average value of absolute values of motion vectors within a specified number of frames is calculated (S68). Here, the camera side CPU 107 reads out motion vectors corresponding to a specified number of frames from history data, that was stored in step S65, and calculates an average value of the motion vectors that have been read out. In a case where the user performs panning shooting, there will be cases where change rate of that panning motion is not constant, and so average value of absolute values of motion vectors corresponding to a specified number of frames is calculated.

Next, it is determined whether or not an average value of absolute values of motion vectors is greater than or equal to a threshold value (S71). Here, the camera side CPU 107 determines whether or not the average value of absolute values of motion vectors that was calculated in step S67 is greater than or equal to the threshold value. If the user is performing panning shooting, then an average value of absolute values of motion vectors that has been calculated by the motion vector calculation circuit 111a will become large. A threshold value used in this determination may be a value such that whether or not panning shooting is being performed can be determined, similarly to the case of FIG. 5. The threshold value is set to an absolute value of a motion vector equivalent to angular velocity of 2 to 4 degrees per second, for example.

If the result of determination in step S71 is that average value of motion vectors is greater than or equal to the threshold value, then large is set at the X, Y movement amount (S73). If large is set as the X, Y movement amount, then in the flow for scan drive limit determination (refer to FIG. 4) a long time value is set as the drive limit running time (refer to S45 in FIG. 4).

On the other hand, if the result of determination in step S71 is that average value of motion vectors is less than the threshold value, then small is set at the X, Y movement amount (S75). If small is set as the X, Y movement amount, then in the flow for scan drive limit determination (refer to FIG. 4) a short time value is set as the drive limit running time (refer to S47 in FIG. 4).

If setting for X, Y movement amount has been set in step S73 or S75, the flow for X, Y movement amount determination is terminated and the originating flow is returned to.

Next, detailed operation of a second modified example of the X, Y movement amount determination of step S41 (refer to FIG. 4) will be described using the flowchart shown in FIG. 7. In the flow shown in FIG. 5, movement of the camera was detected by the angular velocity detection circuit 109 having a Gyro etc., while in the flow shown in FIG. 6 the motion vector calculation circuit 111a calculated motion vectors using image data that was acquired by the image sensor 105 and camera motion was detected based on these motion vectors. By contrast, in the flow shown in FIG. 7 camera motion is detected using subject brightness value that has been detected by the AE evaluation value calculation circuit 110.

If the flow for X, Y movement amount determination shown in FIG. 7 is commenced, first, brightness values at the periphery of a screen are acquired (S63). Here, the AE evaluation value calculation circuit 110 calculates subject brightness value for the periphery of the screen based on image data that has been acquired by the image sensor 105.

Next, brightness values are added to history data (S66). In this step, the camera side CPU 107 stores brightness values that were acquired in step S63, and times of those brightness value acquisitions (corresponding to a frame) in the memory 115.

Next, a maximum value for brightness value change rate within a specified number of frames is calculated (S69). Here, the camera side CPU 107 calculates change rate of brightness values within a specified number of frames, that were stored in step S66, and calculates the largest change rate among these brightness value change rates as a maximum value. In a case where the user performs panning shooting, there will be cases where change rate of that panning motion is not constant, and so change rate at the time that change was largest, among the specified number of frames, is calculated. Specifically, if the camera has large motion the change rate of brightness values will also become large, and so the largest value among change rates for brightness values is detected.

Next, it is determined whether or not a maximum value for brightness change rate is greater than or equal to a threshold value (S72). Here, the camera side CPU 107 determines whether or not the maximum value for brightness change rate that was calculated in step S69 is greater than or equal to the threshold value. If the user is performing panning shooting, brightness that has been calculated by the AE evaluation value calculation circuit 110 will change significantly. On the other hand, if a child playing on a playground rope swing is being photographed change in brightness will not be significant. A threshold value used in this determination may be a value such that whether or not panning shooting is being performed can be determined, similarly to the case of FIG. 5. For example, the threshold value is set to a value representing a brightness change rate of 30 to 50%.

If the result of determination in step S72 is that maximum value of brightness change rate is greater than or equal to the threshold value, then large is set as the X, Y movement amount (S73). If large is set as the X, Y movement amount, then in the flow for scan drive limit determination (refer to FIG. 4) a long time value is set as the drive limit running time (refer to S45 in FIG. 4).

On the other hand, if the result of determination in step S72 is that maximum value of brightness change rate is less than the threshold value, then small is set at the X, Y movement amount (S75). If small is set as the X, Y movement amount, then in the flow for scan drive limit determination (refer to FIG. 4) a short time value is set as the drive limit running time (refer to S47 in FIG. 4).

If setting for X, Y movement amount has been set in step S73 or S75, the flow for X, Y movement amount determination is terminated and the originating flow is returned to. It should be noted that in FIG. 5 to FIG. 7, there is one type of threshold value (S71, S72) for each drawing, but a plurality of threshold values may also be set. In this case, brightness change rate may be classified using a plurality of threshold values, a plurality of values may be provided in accordance with X, Y movement amount, and one of these values is selected based on a result of the brightness change rate classification Also, regarding the threshold values for FIG. 5 to FIG. 7, a plurality of threshold values may be respectively stored in advance, and selectively switched in accordance with shooting conditions such as focal length and aperture value of the photographing lens, and shooting parameters etc. Also, instead of individually adopting the approaches of FIG. 5 to FIG. 7, X, Y movement amount may be determined with a combination of a plurality of approaches.

Next, C-AF control of this embodiment will be described using FIG. 8A to FIG. 10B. With this embodiment, a drive limit running time, which is a time for which scan drive range is restricted in accordance with specified conditions, is set (refer to S27 Yes in FIG. 3A, and to FIG. 4). A scenario where it is desired to restrict the scan drive range is a case such as where a subject moves out of an AF target (lost subject). For example, a case where a subject moves out of an AF target and only a background is contained with the AF target (called background error). On the other hand, in a case of photographing a scene where a child is playing on a playground rope swing from the front, if the child is receding rapidly after having drawn near (called rapid recession), the subject does not move out of the AF target and is within the AF target. In this case the need to restrict scan drive range is low.

Scenes for background error and rapid recession described above will be described in detail using FIG. 8A and FIG. 8B. FIG. 8A shows a case of a background error scene. The user is taking a picture with the camera 20a pointed at a child. The child is moving across in front of the user, being at the position shown by 30a at time T1 and at the position shown by 30b when time T2 is reached. The user therefore performs a pan operation of the camera 20a from the direction of 30a so as to capture the child in the AF target, and at time T2 the camera 20a is facing in the direction of 30b. In a case where the camera 20a is in focus at time T1, if the child moves out of the AF target of the camera 20a after that and background enters the AF target, contrast value of an image acquired within the AF target will be lowered. At this time, if the scan drive range is not restricted the camera focus detection device will move the focus lens significantly to the long distance side so as to focus on the background (which is normally far away). On the other hand, when time T2 is reached and the child enters into the AF target, since the child is in the vicinity of the subject distance for time T1 the focus lens is moved significantly to the close-range side, and focusing time becomes longer. In this way, in a case where scan drive range is not restricted under conditions such as in FIG. 8A, AF tracking performance to focus on a subject is lowered.

FIG. 8B shows a case of a rapidly receding scene. The user is pointing the camera 20a toward a child playing on a playground rope swing. At time T3 the child is at position 31a, then approaches the camera 20a to be at position 31b at time T4. In this way, from time T3 to time T4 the child rapidly approaches the camera 20a, and once time T4 has elapsed the child recedes so as to rapidly move away from the camera 20a. Until time T4 the child is rapidly approaching the camera 20a, and if the child recedes rapidly after that the contrast value of an image acquired within an AF target in which the child is being captured becomes lowered. At this time, if the scan drive range is not restricted it will be possible to move the focus lens to an in-focus position so as to achieve focus, but if the scan drive range is restricted it will not be possible for position of the focus lens to track a subject distance that is changing rapidly.

A case where it is desired to restrict scan drive range is a scene where a subject has moved out of the AF target, such as shown in FIG. 8A. However, with contrast AF it is not possible to determine this condition based on AF evaluation value (contrast value). That is, background error and rapid recession will both appear the same with regard to lowered AF evaluation value. However, occurrence of lost subject in a scene the user is photographing often arises in cases where the user is tracking in order to capture a subject within an AF target, that is, when performing panning shooting or tilt shooting (refer to FIG. 8A). On the other hand, in a case where a scene of a playground rope swing or a child's swing, in which a subject recedes rapidly, is photographed from the front, it is unlikely that the subject will move out of the AF target, and there is less likelihood of panning or tilt being performed (refer to FIG. 8B).

With this embodiment, noting the above-described points, a duration for which scan drive range is restricted is changed in accordance with positional change of the camera body. Further, as shown in FIG. 8A, in a case where positional change of the camera is large, by making a duration for which scan drive range is restricted long, that is, restricting scan drive range by a time required for the user to recapture a lost subject again in the AF target, it is made possible to await the subject entering into the AF target. The scan drive range restriction is then removed after the user has again recaptured the subject in the AF target, making it possible to track to movement of the subject using AF. On the other hand, in a case where positional change of the camera is small, such as shown in FIG. 8B, by making duration for which scan drive range is restricted small (duration is set to 0 in an extreme case), it is made possible to track instantaneously using AF even if a subject that is being captured in the AF target recedes rapidly.

Figure 9A:
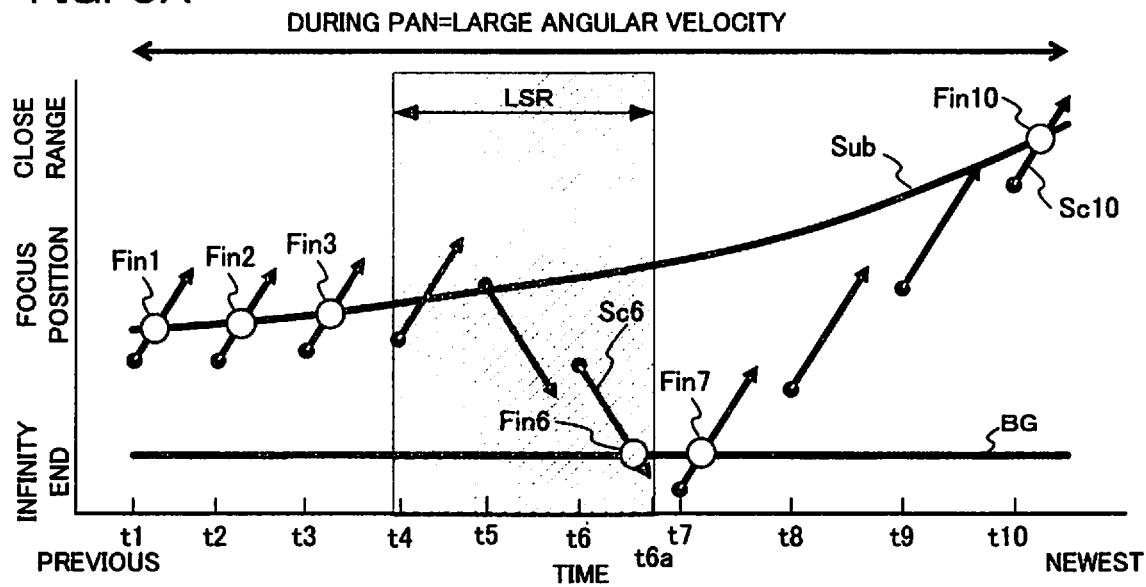
FIG. 9A and FIG. 9B are drawings for explaining movement of a subject in a case of shooting a running race from the side, with the camera of one embodiment of the present invention.
Figure 9B:
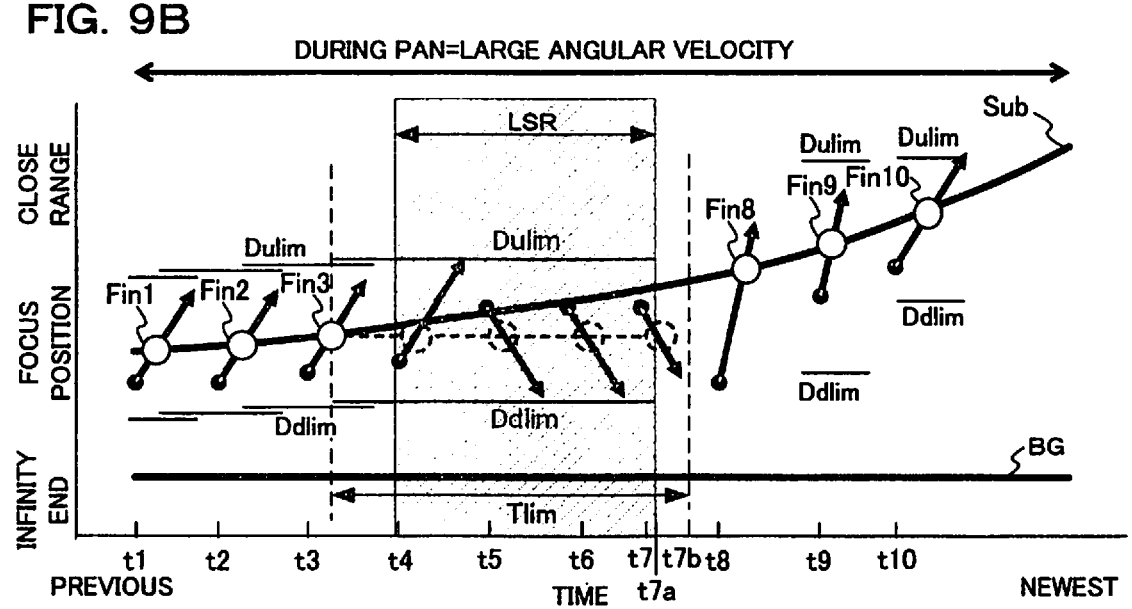

Next, C-AF control for a case of background error will be described using FIG. 9A and FIG. 9B. FIG. 9A and FIG. 9B show a case where a child in a running race etc. is photographed from the side, and lost subject arises, which is the same as the case for previously described FIG. 8A. In the graphs of FIG. 9A and FIG. 9B, the horizontal axis represents flow of time, and the vertical axis represents position of the focus lens. Solid line arrows represent a scan operation. Also, for time on the horizontal axis, a pan operation is performed across all sections, and angular velocity applied to the camera body is large. Further, the curved solid line represents subject Sub position (on the graph, this is replaced by focus lens position).

FIG. 9A shows an example where the scan drive range restriction of this embodiment is not performed. With this example, from time t1 until just before time t4 in-focus positions Fin1 to Fin 3 are detected by respective scan operations and confirmed, but from time t4 until time t6a is a lost subject region LSR, where there is a significantly blurred state, and it is not possible to find an in-focus position using a scan operation. The lost subject region LSR represents a time during which a pan operation is performed by the user so as to capture a child who is moving (subject Sub) within an AF target, and in which the child (subject Sub) has moved out of the AF target. The lost subject region LSR is expected to be about 1 second, including individual differences of various users for a general scene. Although in-focus position Fin6 is found by performing scan Sc6 once time t6 is reached, when only an in-focus position is being detected for a background BG it is not possible to detect in-focus position for the subject Sub.

In FIG. 9A, if the lost subject region LSR ends at time t6a, that is, in a case where the user has again recaptured the child (subject Sub) within the AF target, attempts are made to detect subject Sub in-focus position while scanning the focus lens. However, since a number of frames, corresponding to scan drive performed once, is set to about 15 frames, for example, it is possible to focus on the subject Sub at an in-focus position that is far away from the focus lens position at time t6a after in-focus position Fin10 that is obtained for scan Sc10 from time t10. In this way, with the example shown in FIG. 9A, in a case where a running race is being photographed from the side, if the subject Sub is suddenly lost (lost subject) the camera will focus on something other than the subject (the background BG), and even if the user again recaptures the subject within the AF target it will take quite a long time until focus is achieved on that subject.

FIG. 9B shows an example of a case where the scan drive range restriction of this embodiment is performed, and a restriction time (drive limit running time) Tlim, for which scan drive range is restricted, is provided. With this example, from time t1 until slightly before time t4, in-focus positions Fin1 to Fin3 are detected and confirmed by respective scan drive operations. From time t4 to time t7 is a lost subject region LSR, similarly to the case of FIG. 9A, during which a pan operation is performed by the user so as to capture a child who is moving (subject Sub) within an AF target, and in which the child (subject Sub) has moved out of the AF target resulting in a very blurred state. Since the camera is being subjected to a pan operation, the scan drive range is restricted to an upper limit Dulim and a lower limit Ddlim. During this restriction, that is, during the restriction time (drive limit running time) Tlim, the scan drive range is restricted, and there is no performing of scan drive to an in-focus position corresponding to the background BG.

Handling of the scan drive limit determination of FIG. 4 will be described. Since a pan operation is being performed X, Y movement amount is determined to be large (S43 Yes), and the drive limit running time is set to a long time value (S45). Then, within the drive limit running time Tlim (S49, S51 Yes), the scan drive range is restricted between the upper limit Dulim and the lower limit Ddlim (refer to S53 and S55 Yes in FIG. 4), drive limit is imposed (refer to S57 in FIGS. 4 and S27 in FIG. 3A), and scan drive range is restricted to within the limit distance from the previous in-focus position. Specifically, within the drive limit running time Tlim the focus lens is only capable of moving within the restricted scan drive range. This means that, differing from the case of FIG. 9A, scan drive so as to detect in-focus position of the background BG is not performed, and scan drive range is restricted, resulting in a state where the focus lens is positioned close to a position of the subject Sub.

Once time t7a is reached the lost subject region LSR is finished, that is, a state is entered where the subject is again captured within the AF target. If this state is entered and the restriction time (drive limit running time Tlim) elapses at time t7b, it becomes possible to focus on the subject by means of a scan operation using a scan drive range having restriction removed, and it is possible to detect and track in-focus positions Fin8, Fin9, . . . , and in-focus position of the subject.

In this way, with the example shown in FIG. 9B, in a case where a scene of a running race is being photographed, if the subject Sub moves out of the AF target (lost subject) the user performs a pan operation of the camera in an attempt to capture the subject within the AF target. If this motion of the camera is detected, the scan drive range is restricted, which means that it is possible to position the focus lens close to an in-focus position of the subject before the subject was lost. If the user captures a subject again within the AF target, and a restriction time (drive limit running time Tlim) that is longer than a time considered to be the subject lost section LSR has elapsed, restriction of the scan drive range is removed and it is possible to focus rapidly on the subject. A long time value for the drive limit running time Tlim is set to, for example, 1.1 to 1.5 seconds. This long time value may be changed in accordance with shooting conditions and shooting parameters.

Figure 10A:
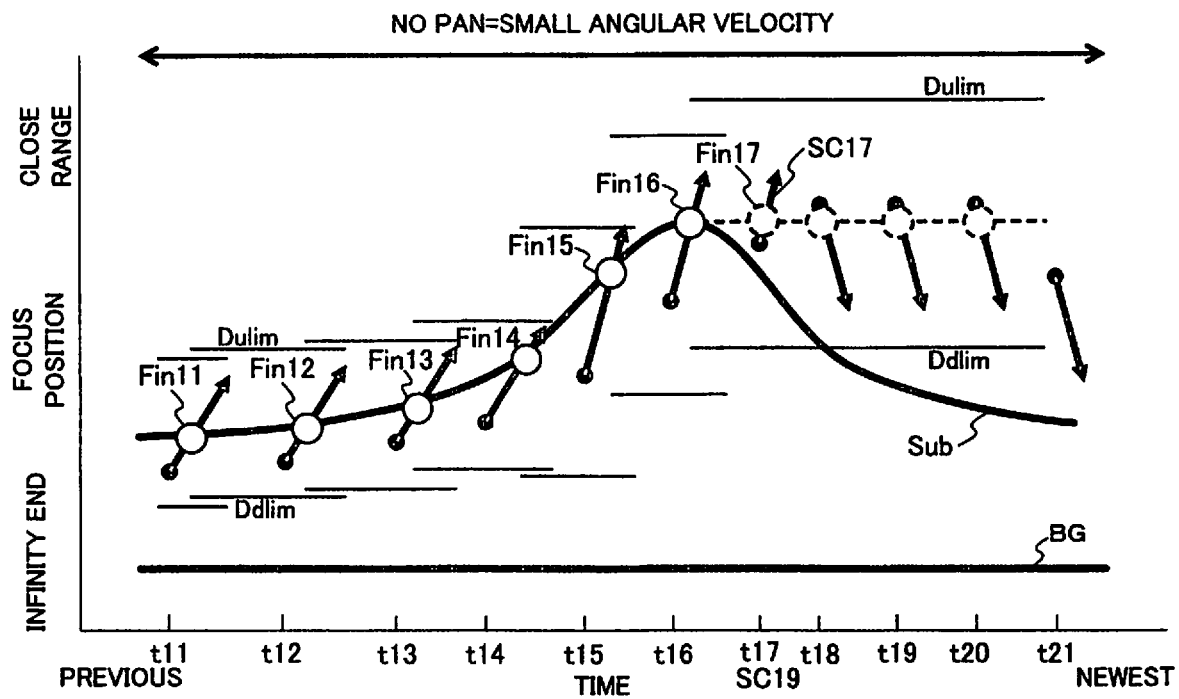
FIG. 10A and FIG. 10B are drawings for explaining movement of a subject in a case of shooting a playground rope swing, with the camera of one embodiment of the present invention.
Figure 10B:
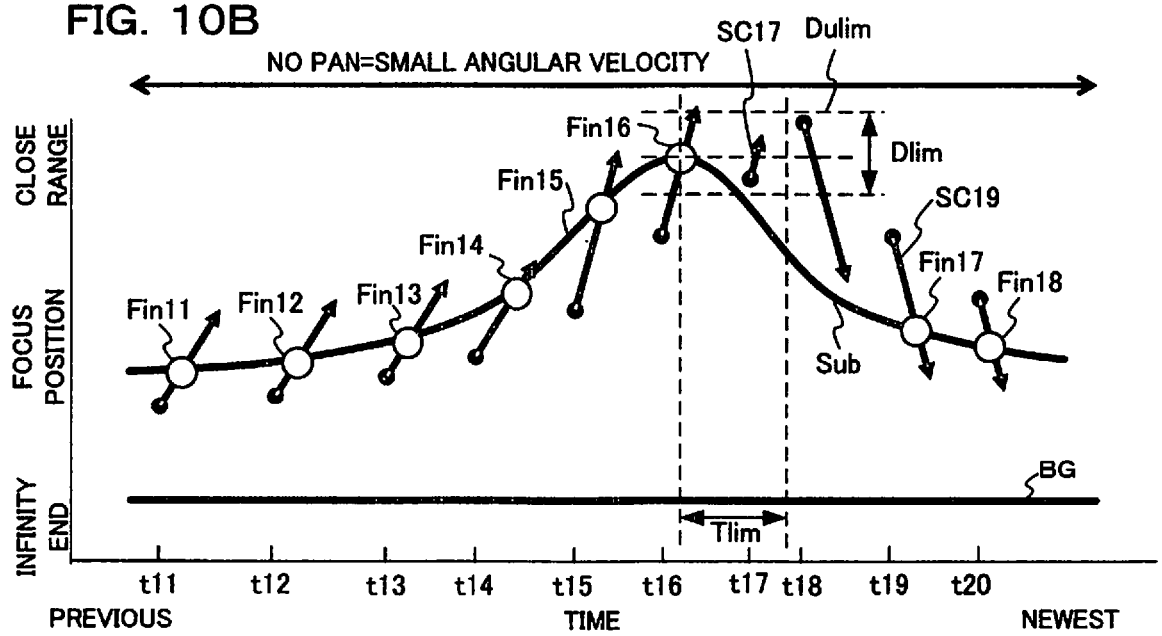

Next, C-AF control for a case of a scene in which rapid recession occurs will be described using FIG. 10A and FIG. 10B. FIG. 10A and FIG. 10B are the same as for the case of FIG. 8B described previously, and show a case where a child or the like (subject Sub) playing on a playground rope swing or swing is photographed from the front, and after the subject has drawn close the subject moves away rapidly. In the graphs of FIG. 10A and FIG. 10B, the horizontal axis represents flow of time, and the vertical axis represents position of the focus lens. Also, for time on the horizontal axis, there is no pan operation across all sections, and angular velocity applied to the camera body is small. Further, the curved solid line represents subject Sub position (on the graph, this is replaced by focus lens position).

FIG. 10A shows an example in which restriction of scan drive range, and providing of a restriction time Tlim for which scan drive range is restricted based on a pan operation that has been detected, which is characteristic processing of this embodiment, are not performed. With this example scan drive range is restricted, and a restriction time for which the scan drive range is restricted is set to a long time value in order to avoid the problem shown in FIG. 9A due to lost subject. It is therefore not possible to track rapid recession of the subject Sub. From time t14 to t16, the subject Sub approaches rapidly, and from time t16 to time t19 the subject Sub is rapidly receding. At time t16, scan drive is performed between the upper limit Dulim and lower limit Ddlim of scan drive range, and in-focus position of the subject is being detected (refer to detected in-focus positions Fin11 to Fin16).

After the subject has approached closest at time t16, the subject is receding rapidly, but by using moving body estimation computation based on information on the detected in-focus positions Fin11 to Fin16, an in-focus position for time t17 more to the close-up end than Fin16 is estimated, a scan drive range is set in accordance with this estimated in-focus position, and scan drive is performed (SC17). However, since the subject Sub is receding rapidly, it is not possible to detect in-focus position with the scan drive SC17. If time t21 is reached, restriction time (long time value) for scan drive range elapses, and the restriction on scan drive range is removed. However, position of the subject Sub at time t21 becomes far away from the scan drive range at time t20 (Dulim to Ddlim), and quite a long time is required until focus is achieved on the subject Sub.

FIG. 10B shows an example in which restriction of scan drive range, and providing of a restriction time (drive limit running time) Tlim for which scan drive range is restricted based on a pan operation that has been detected, which is characteristic processing of this embodiment, are performed. With this example, since there is either no pan operation or only a slight pan operation, a duration for which scan drive range is restricted is made a short time value (S43 No and S47 in FIG. 4). From time t11 to time t16, the same as in FIG. 10A, the subject Sub is tracked moving closer, and in-focus positions Fin11 to Fin16 are detected.

At time t16, by using moving body estimation computation based on information on the detected in-focus positions Fin11 to Fin16, an in-focus position for time t17 more to the close-up end than Fin16 is estimated, a scan drive range is set in accordance with this estimated in-focus position, and scan drive is performed (SC17). However, after time t16, since the subject Sub is receding rapidly, it is not possible to detect in-focus position with the scan drive SC17. Then, since it is not possible to detect in-focus position (S21 No in FIG. 3A), drive limit is imposed (S49, S51 No, S53 Yes, and S57 in FIG. 4) as a result of scan drive limit determination (S25 in FIG. 3A), and scan drive is restricted at the upper limit Dulim of Dlim (S27 Yes in FIG. 3A).

At time t17, restriction of scan drive range is applied, and Tlim of only a short duration from the vicinity of the time of the previous occurrence of in-focus t16 (this short time value includes 0: refer to S47 in FIG. 4) is set. Restriction of scan drive range is removed when detecting lapse of Tlim (drive limit is not imposed) (refer to S49, S51 Yes and S59 in FIG. 4), scan drive is performed, and in-focus position of the subject Sub is detected. Specifically, although the scan drive range is restricted to a focus movement range (limit distance Dlim) centered about the previously detected in-focus position Fin16, since the restriction duration Tlim is a short duration (Short time value) it is possible to remove the restriction of scan drive range in a short duration and rapidly track the subject. With the example shown in FIG. 10B, the restriction duration (drive limit running time) Tlim is a short duration (short time value), and after this duration has elapsed it is possible to detect in-focus position Fin17 using scan drive SC19 at time t19. The short time value for drive limit running time Tlim is set to, for example, from 0 to 0.2 seconds. This short time value may be changed in accordance with shooting conditions and shooting parameters etc.

In this way, with the example shown in FIG. 10B, with a scene where a child etc. playing on a playground rope swing or a swing is being photographed as the subject, the subject is in front of the camera, and in a case where distance from the camera changes quickly the subject is kept captured within the AF target, which means that there is not significant movement of the camera. If it is detected that camera motion is small, then by setting the duration for which the scan drive range is restricted to a short duration (short time value including 0) the restriction of scan drive range is removed after the short time value has elapsed and it is possible to resume focus detection rapidly and achieve focus, even if the subject is receding rapidly.

As has been described above, the focus detection device of one embodiment and modified examples of the present invention has an image sensor (refer to the image sensor 105 in FIG. 1, for example) that subjects subject light that has passed through a photographing optical system to photoelectric conversion and outputs an image signal, and performs focus detection by calculating evaluation values representing contrast based on the image signal, while executing a scan operation to change focus of an image plane of the image sensor (refer, for example, to S15 to S23 in FIG. 3A). As a focus detection method of this focus detection device, positional change of the focus detection device is detected (refer, for example, to S25 in FIG. 3A and S41 in FIG. 4), a running time for which focus movement range of a scan operation is restricted is set based on this positional change (refer, for example, to S25 in FIGS. 3 and S45 and S47 in FIG. 4), and focus detection is performed by restricting focus movement range of the scan operation based on the running time (refer, for example, to S51, S57 and S59 in FIGS. 4, and to S27 in FIG. 3A). As a result, with this embodiment, if the subject re-enters a focus detection range (AF target) it is possible for AF to track even if there is a lost subject, and it is possible for AF to track even if the subject is receding rapidly. That is, even in a case where focus movement range of a scan operation is restricted, by changing a time for which restriction is in place based on positional change of the focus detection device it is possible for AF to track regardless of the state of the subject (even in a case where the subject is receding rapidly).

Also, with one embodiment and modified examples of the present invention, a running time during which focus movement range of a scan operation is restricted is made longer with increase in positional change of the focus detection device (refer, for example, to S43 to S47 in FIG. 4). In a case where the user is moving position of the focus detection device significantly, it takes time until the user captures the subject, while if position of the focus detection device is not moving significantly the subject remains captured. In this way, by changing restriction time of the focus movement range in accordance with positional change of the focus detection device, it is possible for AF to track regardless of the state of the subject.

Also, with one embodiment and modified examples of the present invention, in a case where an elapsed time from the time of previously being in focus to the current time is less than the running time, focus movement range from the previous in-focus position is restricted to a specified amount (refer, for example, to S49 to S57 in FIG. 4). That is, for a predetermined time (running time) from when the focus lens is in focus, movement range of the focus lens is restricted to a specified amount (limit distance). This means that during the predetermined time (running time), if the subject enters (or returns) to the AF target after the predetermined time has elapsed without significant movement of the focus lens, a state of having rapidly achieved focus is entered.

It should be noted that with the one embodiment and modified examples of the present invention, circuits such as the angular velocity detection circuit 109 and the motion vector calculation circuit 111a are provided as a positional change detection section (positional change detection circuit). However, as the positional change detection section, since it is desired to perform detection of positional change using any one of angular velocity detection, motion vector detection or brightness value detection, the forms of detection that are not used may be omitted. Also, although detection of positional change is performed using any one of angular velocity detection, motion vector detection or brightness value detection with the one embodiment and modified examples of the present invention, positional change may also be detected by combining these detection method. Accordingly, there should be at least one of an angular velocity detection circuit, a motion vector calculation circuit, and a brightness value calculation circuit, for detecting positional change of the focus detection device.

Also, with the one embodiment and modified examples of the present invention, the AF evaluation value calculation circuit 108, AE evaluation value calculation circuit 109, AE evaluation value calculation circuit 110, and image processing circuit 111 etc. have been provided separately to the camera side CPU 107. However, this is not limiting and some or all of these circuits may be incorporated into peripheral circuitry of the camera side CPU 107. Also, instead of these hardware circuits, the present invention may also be constructed in the form of software using a CPU and programs, or may be constructed in hardware such as gate circuitry generated based on a programming language described using Verilog, or may be constructed using a DSP (digital signal processor). Suitable combinations of these approaches may also be used. The use of a CPU is also not limiting as long as elements fulfill a function as a controller.

Also, the CPU within the camera side CPU 107 may be an element that fulfills a function as a controller. Processing of each of the above described circuits may also be performed by one or more processors configured as hardware. For example, each section may be a processor constructed as respective electronic circuits, and may be respective circuits sections of a processor that is constructed with an integrated circuit such as an FPGA (Field Programmable Gate Array). Alternatively, a processor that is constructed with one or more CPUs may execute functions of each section, by reading out and executing computer programs that have been stored in a storage medium.

Also, with this embodiment, a device for taking pictures has been described using a digital camera, but as a camera it is also possible to use a digital single lens reflex camera, a mirror-less camera, or a compact digital camera, or a camera for movie use such as a video camera, and further to have a camera that is incorporated into a mobile phone, a smartphone a mobile information terminal, personal computer (PC), tablet type computer, game console etc., or a camera for a scientific instrument such as a medical camera (for example, a medical endoscope), or a microscope, an industrial endoscope, a camera for mounting on a vehicle, a surveillance camera etc. In any event, it is possible to adopt the present invention as long as a device performs automatic focusing using contrast AF.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus detection device, comprising an image sensor that outputs an image signal by subjecting subject light that passes through a photographing optical system to photoelectric conversion, and that performs focus detection by calculating evaluation values representing contrast based on the image signal, while executing a scan operation to change focus of an image plane of the image sensor to change, comprising:
a positional change detection circuit for detecting positional change of the focus detection device; and
a processor having a running time setting section and a control section,
wherein
the running time setting section sets running time for restricting focus movement range of the scan operation based on the positional change;
the control section performs focus detection by restricting focus movement range of the scan operation based on the running time; and
the running time setting section makes running time longer as positional change becomes larger.

2. The focus detection device of claim 1, wherein:
the control section, in a case where the scan operation has been repeatedly executed and in-focus has been detected, acquires time when the focus was reached, and in-focus position, and in a case where an elapsed time from a time when focus was achieved previously to the current time is less than the running time, restricts focus movement range from a previous in-focus position to a specified amount.

3. The focus detection device of claim 2, wherein:
the control section removes restriction to focus movement range from the previous in-focus position in a case where an elapsed time from the time focus was previously achieved to the current time is greater than or equal to the running time.

4. The focus detection device of claim 1, wherein:
the positional change detection circuit detects angular velocity applied to the focus detection device and detects the positional change based on the angular velocity.

5. The focus detection device of claim 1, wherein:
the positional change detection circuit detects the positional change using motion vectors based on output of the image sensor.

6. The focus detection device of claim 1, wherein:
the positional change detection circuit detects the positional change using brightness change based on output of the image sensor.

7. A focus detection method, for a focus detection device comprising an image sensor that outputs an image signal by subjecting subject light that passes through a photographing optical system to photoelectric conversion, and that performs focus detection by calculating evaluation values representing contrast based on the image signal, while executing a scan operation to change focus of an image plane of the image sensor to change, comprising:
detecting positional change of the focus detection device;
setting running time for restricting focus movement range of the scan operation based on the positional change;
performing focus detection by restricting focus movement range of the scan operation based on the running time; and
making the running time longer as positional change becomes larger.

8. The focus detection method of claim 7, further comprising:
in a case where the scan operation has been repeatedly executed and in-focus has been detected, acquiring time when the focus was reached, and in-focus position, and in a case where an elapsed time from a time when focus was achieved previously to the current time is less than the running time, restricting focus movement range from a previous in-focus position to a specified amount.

9. The focus detection method of claim 8, further comprising:
removing restriction to focus movement range from the previous in-focus position in a case where an elapsed time from the time focus was previously achieved to the current time is greater than or equal to the running time.

10. The focus detection method of claim 7, further comprising:
detecting angular velocity applied to the focus detection device and detecting the positional change based on the angular velocity.

11. The focus detection method of claim 7, further comprising:
   detecting the positional change using motion vectors based on output of the image sensor.

12. The focus detection method of claim 7, further comprising:
   detecting the positional change using brightness change based on output of the image sensor.

13. A non-transitory computer-readable medium, storing a processor executable code, which when executed by at least one processor, the processor being provided within a focus detection device, the focus detection device comprising an image sensor that outputs an image signal by subjecting subject light that passes through a photographing optical system to photoelectric conversion, and the focus detection device performing focus detection by calculating evaluation values representing contrast based on the image signal, while executing a scan operation to change focus of an image plane of the image sensor to change, performs a focus detection method, the focus detection method comprising:
   detecting positional change of the focus detection device;
   setting running time for restricting focus movement range of the scan operation based on the positional change;
   performing focus detection by restricting focus movement range of the scan operation based on the running time; and
   making the running time longer as positional change becomes larger.

14. The non-transitory computer-readable medium of claim 13, storing further processor executable code, which when executed by the at least one processor, causes the at least one processor to perform the focus detection method further comprising:
   in a case where the scan operation has been repeatedly executed and in-focus has been detected, acquiring time when the focus was reached, and in-focus position, and in a case where an elapsed time from a time when focus was achieved previously to the current time is less than the running time, restricting focus movement range from a previous in-focus position to a specified amount.

15. The non-transitory computer-readable medium of claim 14, storing further processor executable code, which when executed by the at least one processor, causes the at least one processor to perform the focus detection method further comprising:
   removing restriction to focus movement range from the previous in-focus position in a case where an elapsed time from the time focus was previously achieved to the current time is greater than or equal to the running time.

16. The non-transitory computer-readable medium of claim 13, storing further processor executable code, which when executed by the at least one processor, causes the at least one processor to perform the focus detection method further comprising:
   detecting angular velocity applied to the focus detection device and detecting the positional change based on the angular velocity.

17. The non-transitory computer-readable medium of claim 13, storing further processor executable code, which when executed by the at least one processor, causes the at least one processor to perform the focus detection method further comprising:
   detecting the positional change using motion vectors based on output of the image sensor.

* * * * *